(12) United States Patent
Lindbo et al.

(10) Patent No.: US 12,246,919 B2
(45) Date of Patent: Mar. 11, 2025

(54) ROBOTIC PROCESSING SYSTEM AND METHOD

(71) Applicant: OCADO INNOVATION LIMITED, Hatfield (GB)

(72) Inventors: Lars Sverker Ture Lindbo, Hatfield (GB); Paul Clarke, Hatfield (GB); Paul Heideman, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 1517 days.

(21) Appl. No.: 16/338,298

(22) PCT Filed: Sep. 29, 2017

(86) PCT No.: PCT/EP2017/074913
§ 371 (c)(1),
(2) Date: Mar. 29, 2019

(87) PCT Pub. No.: WO2018/060504
PCT Pub. Date: Apr. 5, 2018

(65) Prior Publication Data
US 2020/0017302 A1    Jan. 16, 2020

(30) Foreign Application Priority Data

Sep. 29, 2016  (GB) ..................... 1616559

(51) Int. Cl.
*B65G 1/137*   (2006.01)
*A21B 3/00*   (2006.01)
(Continued)

(52) U.S. Cl.
CPC .............. *B65G 1/1373* (2013.01); *A21B 3/00* (2013.01); *B65D 88/32* (2013.01); *B65G 1/0464* (2013.01);
(Continued)

(58) Field of Classification Search
CPC .... B65G 1/1373; B65G 53/36; B65G 1/0464; B65D 88/28
See application file for complete search history.

(56) References Cited

U.S. PATENT DOCUMENTS 3,942,426 A * 3/1976 Binks ................... A23L 3/3418
219/400
5,144,879 A * 9/1992 Alessi ................. G07F 17/0078
99/335
(Continued)

FOREIGN PATENT DOCUMENTS

CN    1417001 A    5/2003
CN    204111724 U  1/2015
(Continued)

OTHER PUBLICATIONS

Office Action (Notification of Reason for Refusal) issued on Sep. 30, 2021, by the Korean Patent Office in corresponding Korean Patent Application No. 10-2019-7012268, and an English Translation of the Office Action. (28 pages).
(Continued)

*Primary Examiner* — Sean M Michalski
(74) *Attorney, Agent, or Firm* — Buchanan Ingersoll & Rooney, PC

(57) ABSTRACT

A robotic processing system and method are disclosed for processing materials using a series of containers stored in an automated storage and picking system. Each of the containers performs a specific function on the materials stored therein. The materials are passed from bin to bin via a suitable dispensing and transferring system. For example, a system is disclosed for delivering ingredients to a microbrewery, as are methods for brewing small or test batches of beer according to customers' individual requirements.

17 Claims, 16 Drawing Sheets

(51) Int. Cl.
    *B24B 31/02*     (2006.01)
    *B24B 31/06*     (2006.01)
    *B65D 88/32*     (2006.01)
    *B65G 1/04*     (2006.01)
    *B65G 53/36*     (2006.01)
    *C12C 11/00*     (2006.01)
    *C12C 13/10*     (2006.01)
    *C12H 1/00*     (2006.01)

(52) U.S. Cl.
    CPC ............ *B65G 53/36* (2013.01); *C12C 11/006* (2013.01); *C12C 13/10* (2013.01); *C12H 1/00* (2013.01); *B24B 31/02* (2013.01); *B24B 31/06* (2013.01); *B65G 2201/025* (2013.01)

(56) References Cited

U.S. PATENT DOCUMENTS

| | | | | |
|---|---|---|---|---|
| 6,032,571 | A * | 3/2000 | Brous | C12C 13/10 99/348 |
| 8,276,505 | B2 * | 10/2012 | Buehler | A47J 44/00 99/348 |
| 8,585,341 | B1 * | 11/2013 | Oren | B65D 90/587 414/407 |
| 9,827,678 | B1 * | 11/2017 | Gilbertson | A47L 11/4055 |
| 11,744,403 | B2 * | 9/2023 | Sinnet | A47J 44/00 99/334 |
| 2004/0112372 | A1 * | 6/2004 | Dumoux | A47J 27/05 126/369 |
| 2005/0155664 | A1 | 7/2005 | Mabelly | |
| 2006/0041448 | A1 * | 2/2006 | Patterson | G06Q 10/101 705/300 |
| 2013/0220133 | A1 * | 8/2013 | Plutshack | C12C 11/00 99/276 |
| 2014/0017354 | A1 | 1/2014 | Joseph et al. | |
| 2015/0127143 | A1 * | 5/2015 | Lindbo | G05B 15/02 700/218 |
| 2015/0291348 | A1 * | 10/2015 | Lopez | B65D 90/587 220/1.5 |
| 2015/0329808 | A1 | 11/2015 | Ramsey | |
| 2016/0145058 | A1 * | 5/2016 | Lindbo | B65G 1/0457 700/218 |
| 2016/0272927 | A1 | 9/2016 | Mitchell | |
| 2016/0297605 | A1 | 10/2016 | Lopez | |
| 2017/0129703 | A1 * | 5/2017 | Lindbo | B65G 1/0464 |
| 2017/0140327 | A1 * | 5/2017 | Lindbo | B65G 1/0464 |
| 2018/0029798 | A1 | 2/2018 | Lindbo et al. | |
| 2018/0242784 | A1 * | 8/2018 | Hoyer | A21B 7/005 |
| 2020/0017302 | A1 | 1/2020 | Lindbo et al. | |
| 2022/0051178 | A1 * | 2/2022 | Han | G05B 19/4155 |
| 2022/0296754 | A1 * | 9/2022 | Strauss | B25J 15/0061 |
| 2022/0346598 | A1 * | 11/2022 | Sinnet | B65G 11/023 |
| 2022/0354306 | A1 * | 11/2022 | Sinnet | B25J 11/0045 |
| 2023/0014506 | A1 * | 1/2023 | Austrheim | B61B 5/02 |
| 2023/0028034 | A1 * | 1/2023 | Gravelle | B65G 1/0485 |
| 2024/0262617 | A1 * | 8/2024 | Lindbo | B65G 1/0464 |
| 2024/0270491 | A1 * | 8/2024 | Bannister | E01B 25/28 |
| 2024/0286833 | A1 * | 8/2024 | Heggebo | B65G 1/10 |
| 2024/0316374 | A1 * | 9/2024 | Selim | A62B 35/0081 |
| 2024/0326956 | A1 * | 10/2024 | Benedict | B65G 1/0478 |

FOREIGN PATENT DOCUMENTS

| | | |
|---|---|---|
| CN | 107287064 A | 10/2017 |
| DE | 10023704 A1 | 11/2001 |
| EP | 1037828 B1 | 9/2003 |
| EP | 3519551 A1 | 8/2019 |
| GB | 2532931 A | 6/2016 |
| JP | S52138589 U | 10/1977 |
| JP | H04129657 A | 4/1992 |
| JP | 3048890 U | 5/1998 |
| JP | 2003026296 A | 1/2003 |
| JP | 2005518317 A | 6/2005 |
| JP | 2014132865 A | 7/2014 |
| NO | 317366 B1 | 10/2004 |
| WO | 2013004102 A1 | 1/2013 |
| WO | 2013167907 A1 | 11/2013 |
| WO | 2014195901 A1 | 12/2014 |
| WO | 2015197709 A1 | 12/2015 |
| WO | 2017081281 A1 | 5/2017 |
| WO | 2018060504 A1 | 4/2018 |

OTHER PUBLICATIONS

Office Action issued on Jun. 2, 2021, by the Canadian Patent Office in corresponding Canadian Patent Application No. 3,038,738. (4 pages).
First Office Action issued on May 18, 2021, by the Japanese Patent Office in corresponding Japanese Patent Application No. 2019-517230, and an English Translation of the Office Action. (10 pages).
First Office Action issued on Oct. 27, 2020, by the Japanese Patent Office in corresponding Japanese Patent Application No. 2019-517230, and an English Translation of the Office Action. (15 pages).
Office Action (Communication) issued on Oct. 28, 2021, by the European Patent Office in corresponding European Patent Application No. 17784229.1. (18 pages).
Office Action issued on Jan. 10, 2022, by the Canadian Patent Office in corresponding Canadian Patent Application No. 3038738. (3 pages).
International Search Report (PCT/ISA/210) mailed on Mar. 12, 2018, by the European Patent Office as the International Searching Authority for International Application No. PCT/EP2017/074913.
Search Report for GB Application No. 1715917.9 dated Mar. 28, 2018.
Written Opinion (PCT/ISA/237) mailed on Mar. 12, 2018, by the European Patent Office as the International Searching Authority for International Application No. PCT/EP2017/074913.
Office Action issued on Aug. 4, 2022, by the Canadian Patent Office in corresponding Canadian Patent Application No. 3,038,738. (3 pages).
Office Action (Examination Report No. 1) issued on Jul. 21, 2021, by the Australian Patent Office in corresponding Australian Patent Application No. 2017336366. (4 pages).
First Office Action issued on May 28, 2024, by the Japanese Patent Office in corresponding Japanese Patent Application No. 2023-071568, and an English Translation of the Office Action. (4 pages).

* cited by examiner

ROBOTIC PROCESSING SYSTEM AND METHOD

The present invention relates to a system for processing materials in an automated storage system, the system comprising a series of stacked bins accessed robotically. More specifically but not exclusively it relates to a method of processing materials in an automated storage system in which the process occurs in a series of bins, the order of the bins being reconfigurable such that variations in the process are possible by the re-ordering of the steps of the processes as required. For example, such reconfiguration of process steps may relate to a system and method for delivering ingredients to a micro-brewery and to methods for brewing small or test batches of beer according to customers' individual requirements.

This application claims priority from UK Patent Application No GB1616559.9 filed on $29^{th}$ Sep. 2016, hereby incorporated by reference.

Some commercial and industrial activities require systems that enable the storage and retrieval of a large number of different products. One known type of system for the storage and retrieval of items in multiple product lines involves arranging storage bins or containers in stacks on top of one another, the stacks being arranged in rows. The storage bins or containers are accessed from above, removing the need for aisles between the rows and allowing more containers to be stored in a given space.

EP 1037828 B1 (Autostore) the contents of which are incorporated herein by reference, describes a system in which stacks of containers are arranged within a frame structure. A system of this type is illustrated schematically in FIGS. 1 to 4 of the accompanying drawings. Robotic load handling devices can be controllably moved around the stack on a system of tracks on the upper most surface of the stack.

One form of robotic load handling device is further described in Norwegian patent number 317366, the contents of which are incorporated herein by reference. A further development of load handling device is described in UK Patent Application No GB1413155.1 where each robotic load handler only covers one grid space, thus allowing higher density of load handlers and thus higher throughput of a given size system. FIGS. 3(*a*) and 3(*b*) are schematic perspective views of a load handling device from the rear and front, respectively, and FIG. 3(*c*) is a schematic front perspective view of a load handling device lifting a bin.

A first aspect of the invention is based on the idea that a series of different bins or containers can be used to perform one or more stages in any process requiring a series of sequential steps to be performed. This sequential processing can be achieved by providing the bins with suitable dispensing means allowing the contents therein to be transferred between bins as required by the process. Furthermore, given the arrangement and access to the bins or containers, it is possible to reconfigure the order in which materials within the bins are processed. This may be required in, for example, trials or experimental procedures requiring variation of, for example, processing time, temperature, pressure or any other processing variable as defined by the process in hand.

According to the invention there is provided an automated storage and processing system comprising a series of bins, a first portion of the bins comprising storage for raw materials to be processed, a second portion of the bins comprising processing means for performing a specific function within the bin, the processing means acting on materials located in the bins, the processed materials being passed from bin to bin by dispensing means, the process from the first bin to the last bin being conducted without user intervention such that raw materials input in to the bins are processed in accordance with a predetermined series of steps to achieve an end result, each of the steps being conducted in a predetermined bin.

According to the invention there is provided a method of performing a process within an automated storage and processing system, the storage system comprising a plurality of containers stacked in stacks within a framework, a plurality of load handling devices being operable on the framework, the method comprising the steps of: storing materials required for the process within containers within the stacks; moving required containers using the load handling devices; dispensing the required materials in to a process container or through a series of process containers for processing; dispensing the resultant processed materials in to suitable storage means.

It is one object of the present invention to provide a storage system for storing a variety of ingredients routinely used for brewing a variety of different beers, and for delivering the ingredients to a micro-brewery using robotic load handling devices to enable small batches of beer to be brewed according to a customers' individual requirements in an efficient, cost effective, controllable, and consistent manner.

It is a further object of the present invention to provide a storage and processing system for storing and processing a variety of gemstones requiring different levels of processing, a series of bins or containers providing the means necessary for processing the gemstones in a predetermined but variable processing order, as required by the specific nature of the individual gemstone to be processed.

It is yet a further object of the present invention to provide a storage and processing system for storing and processing a variety of active ingredients for the preparation of medicaments, a series of bins or containers providing the means necessary for processing the raw materials in a predetermined but variable processing order, as required by the manufacturing steps of the medicaments. Such a process may include the process of microbial fermentation, but other processes may be used.

It is yet a further object of the present invention to provide a storage and processing system for storing and processing raw ingredients for the preparation of foodstuffs, a series of bins or containers providing the means necessary for processing the ingredients in a predetermined but variable processing order, as required by the preparation steps of the foodstuffs. Such foodstuffs may include but not be limited to living organisms such as insects or shellfish. However it will be appreciated that other foodstuffs such as bread or other bakery products may be envisaged.

It will be appreciated that whilst the invention is described below is described in detail, with reference to a system for brewing, there are many other applications of the invention, some of which are detailed above, that benefit from the ability to assemble a production line in which each bin performs a specific function, the end result being a process performed from start to finish within bins stored within such a storage system. It will also be appreciated that the application of the invention to alcohol need not be limited to brewing but may include other fermentation processes such as the production of wine or spirits such as gin.

Advantageously, this process can be performed on demand with steps in the process being added, removed or varied as required, subject to the appropriate bins being available for use.

Furthermore, it will be appreciated that several processes may be run in parallel, different bins being used as necessary subject to the process requirements. It will also be appreciated that an overall process may only be part performed in the bins. Other parts of the process may be conducted in specialised equipment not easily disposed within a storage structure or bin.

Applications envisaged for this invention include, but are not limited to, bread making, pizza making, gem polishing, pharmaceutical testing or preparation and materials sortation.

In each of these applications individual steps of an overall process may be carried out in separate bins, the bins being provided with appropriate processing means such as heaters, coolers, mixers, dispensers, lighting means, atmospheric controlling means and the like.

For example, in the case of bread making, the ingredients may be stored in storage bins, dispensed in appropriate amounts into a mixing bin, mixed for the required duration, transferred in to a proving bin for a predetermined time and baked in a baking bin.

The example below relates to brewing of beer, but it will be appreciated any form of alcohol requiring brewing may be envisaged. Furthermore, from the foregoing it will be appreciated that this is an example only and other processes may be considered.

According to one form invention there is provided an automated picking system including a micro-brewery.

In another aspect the invention provides an automated picking system for storing a multiplicity of different brewing ingredients and conveying them to an external or internal micro-brewery.

In a further aspect the invention provides a method of conveying the contents of one or more storage bin to a microbrewery.

In a further aspect the invention provides a single use or reusable liner for a bin for use in the automated picking system.

In a further aspect the invention provides a bin for use in the automated picking system comprising one or more of: heating means, cooling means, stirring means, temperature monitoring means, opacity monitoring means, a slit base, recirculation means, water inlet means, bottling means, filtering means, freezing means and weighing means.

Preferred features of the invention are defined in the claims.

In this way, the present invention provides a fully automated micro-brewery and brewing methods.

In one aspect the invention is based on the idea that a series of different brewing bins can be used to perform one or more stage in the brewing process. The bin contents are treated then dispensed into the bin beneath it in the stack to undergo the next stage in the brewing process.

By treating the contents of each brewing bin individually small batch, customised brewing can be fully automated.

Figure 1:
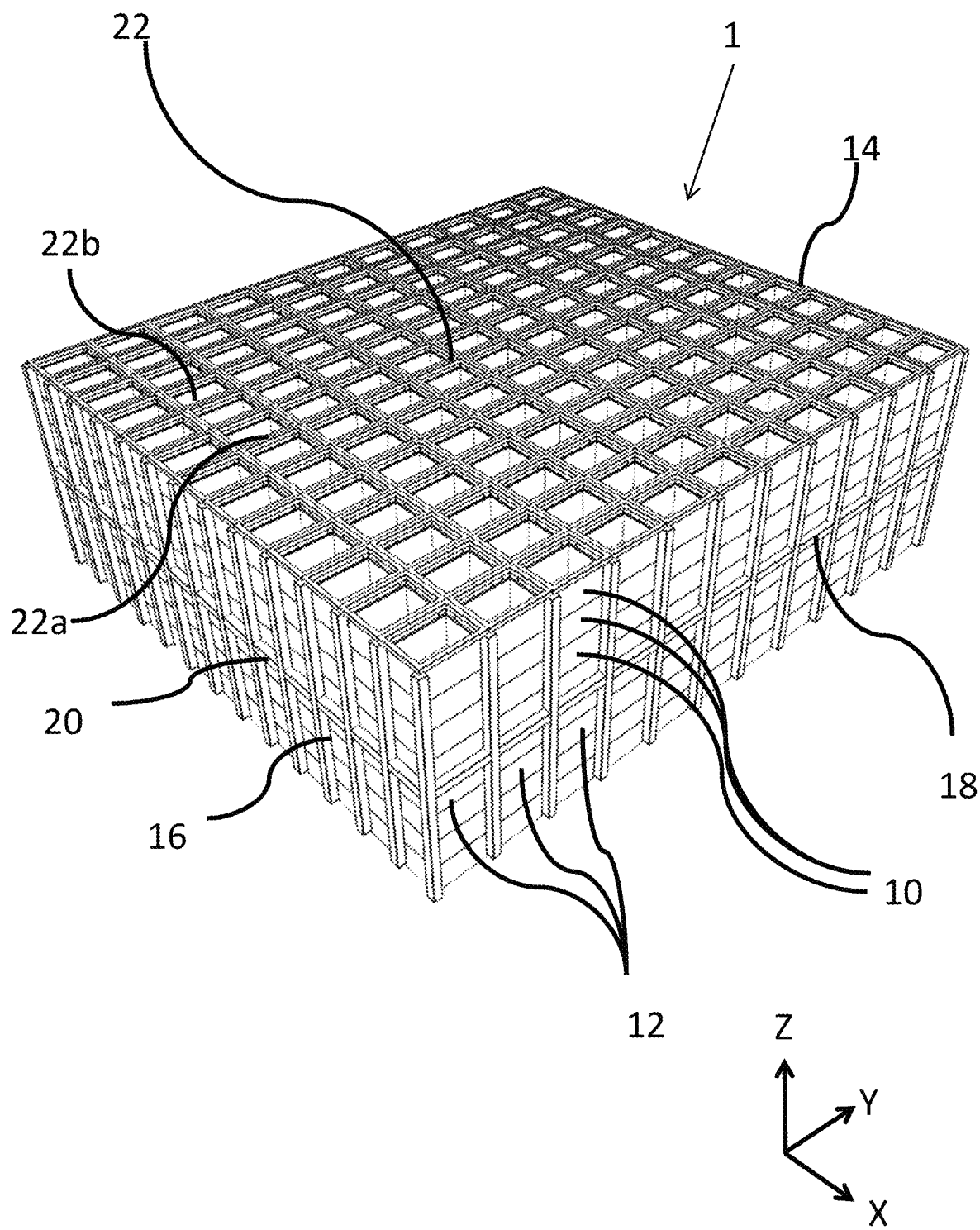
FIG. 1 is a schematic perspective view of a frame structure for housing a plurality of stacks of bins in a known storage system.
Figure 2:
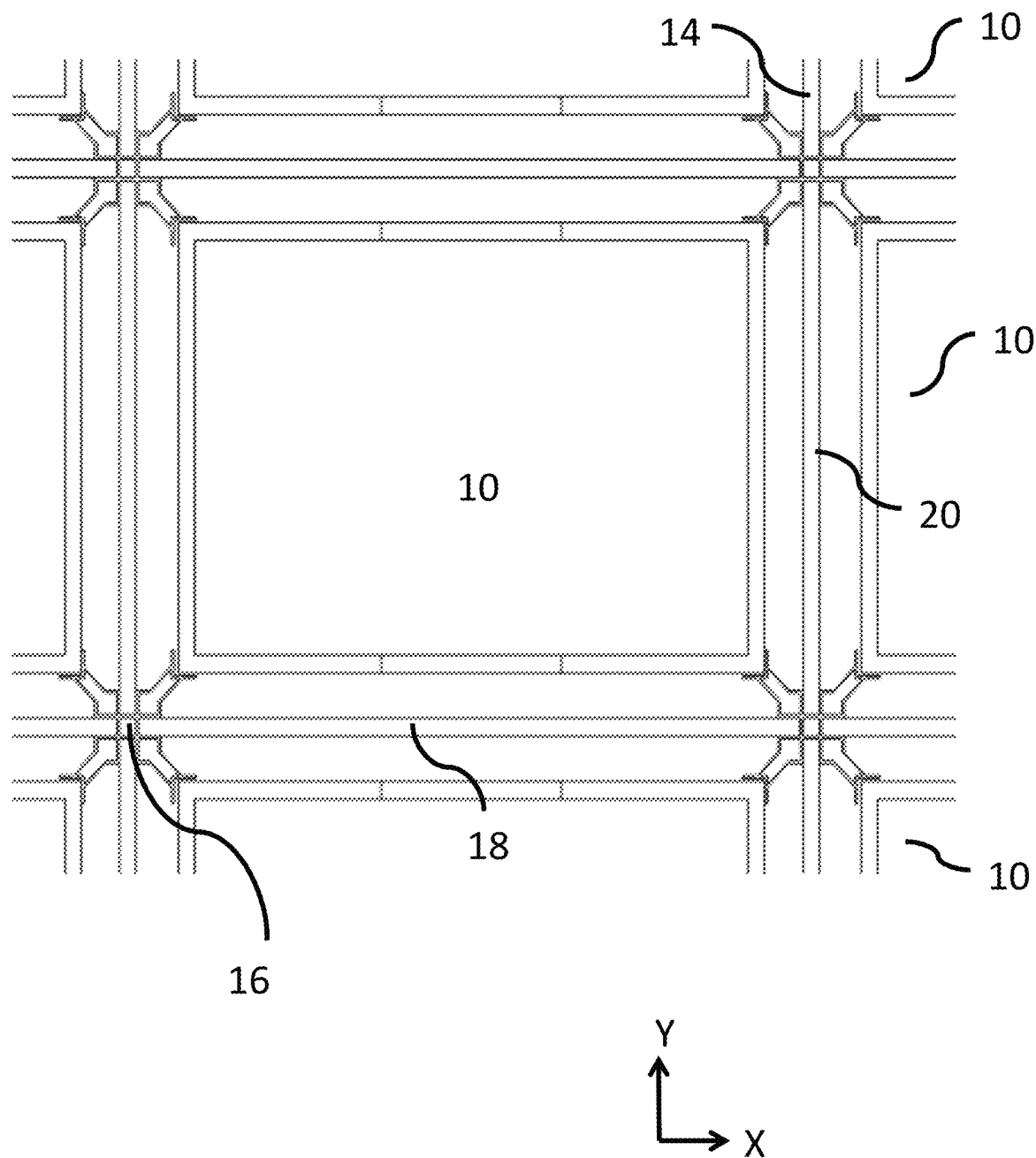
FIG. 2 is a schematic plan view of part of the frame structure of FIG. 1.
Figure 3A:
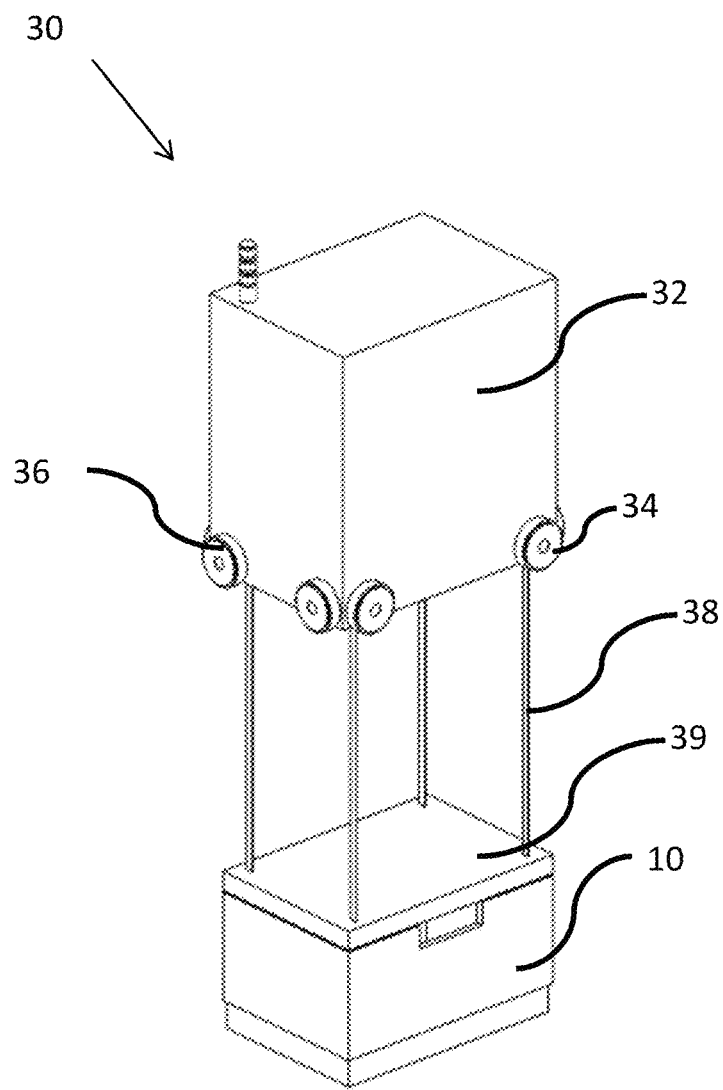
Figures 3B, 3C:
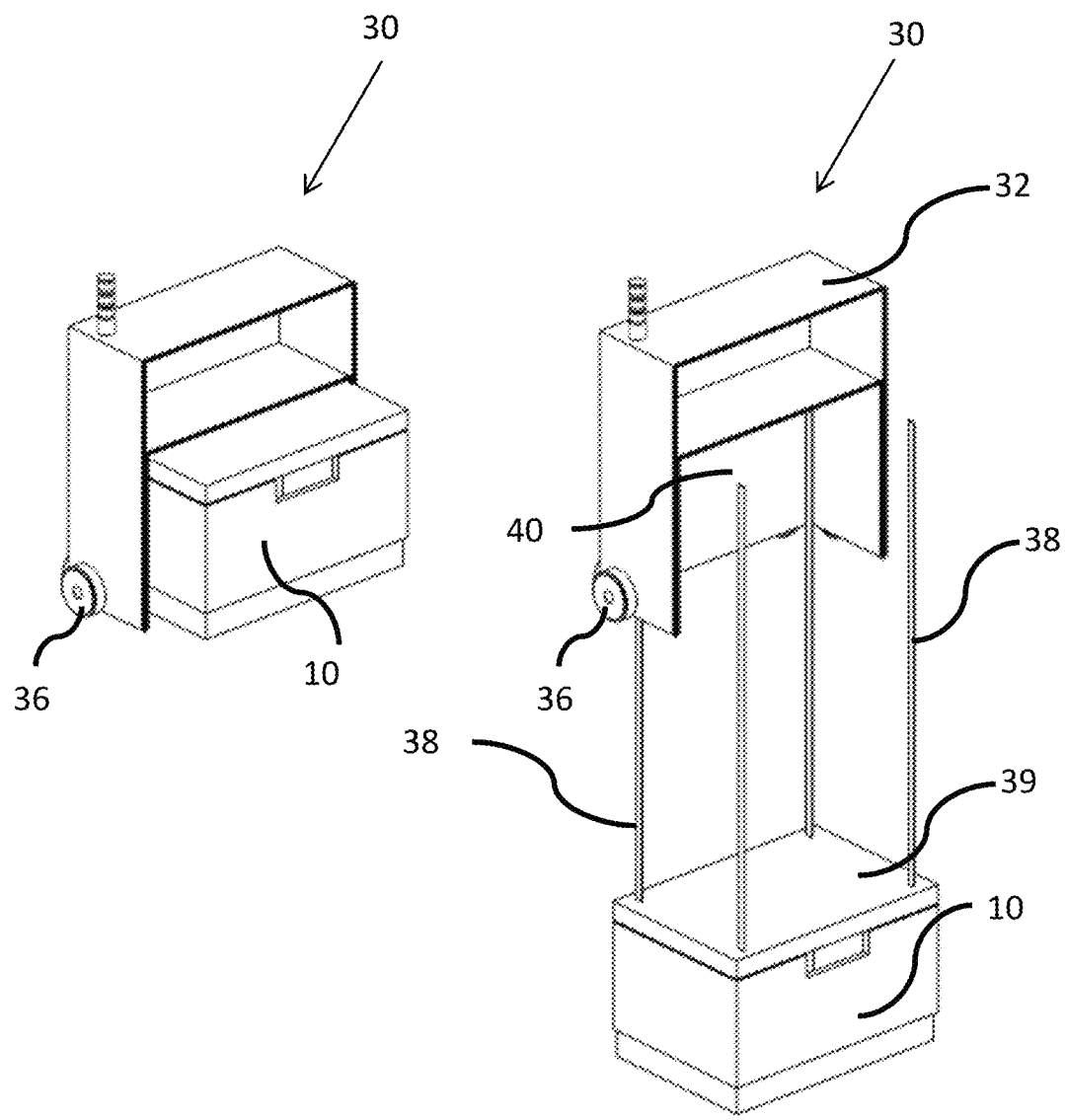
Figure 4:
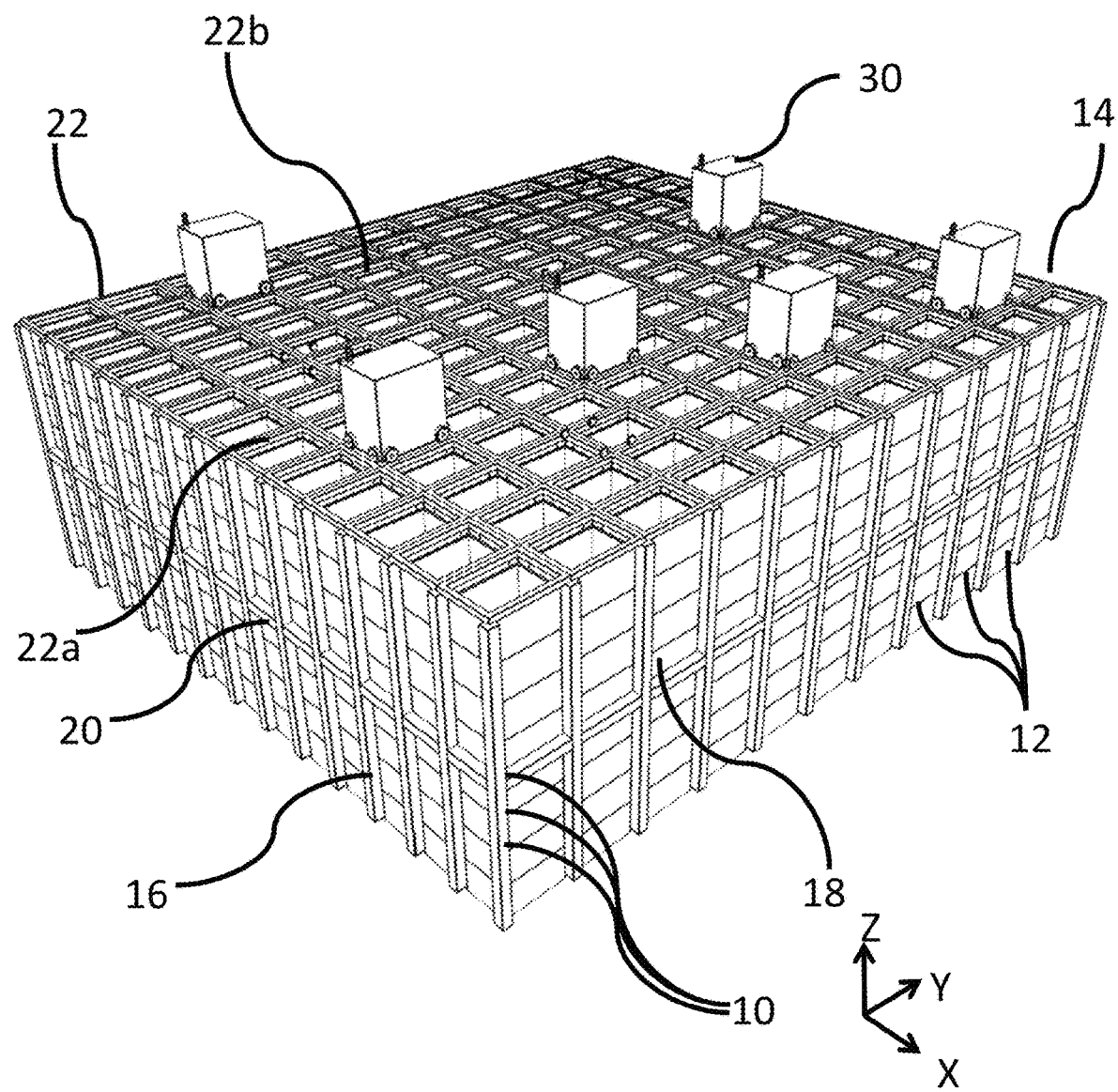
Figure 5:
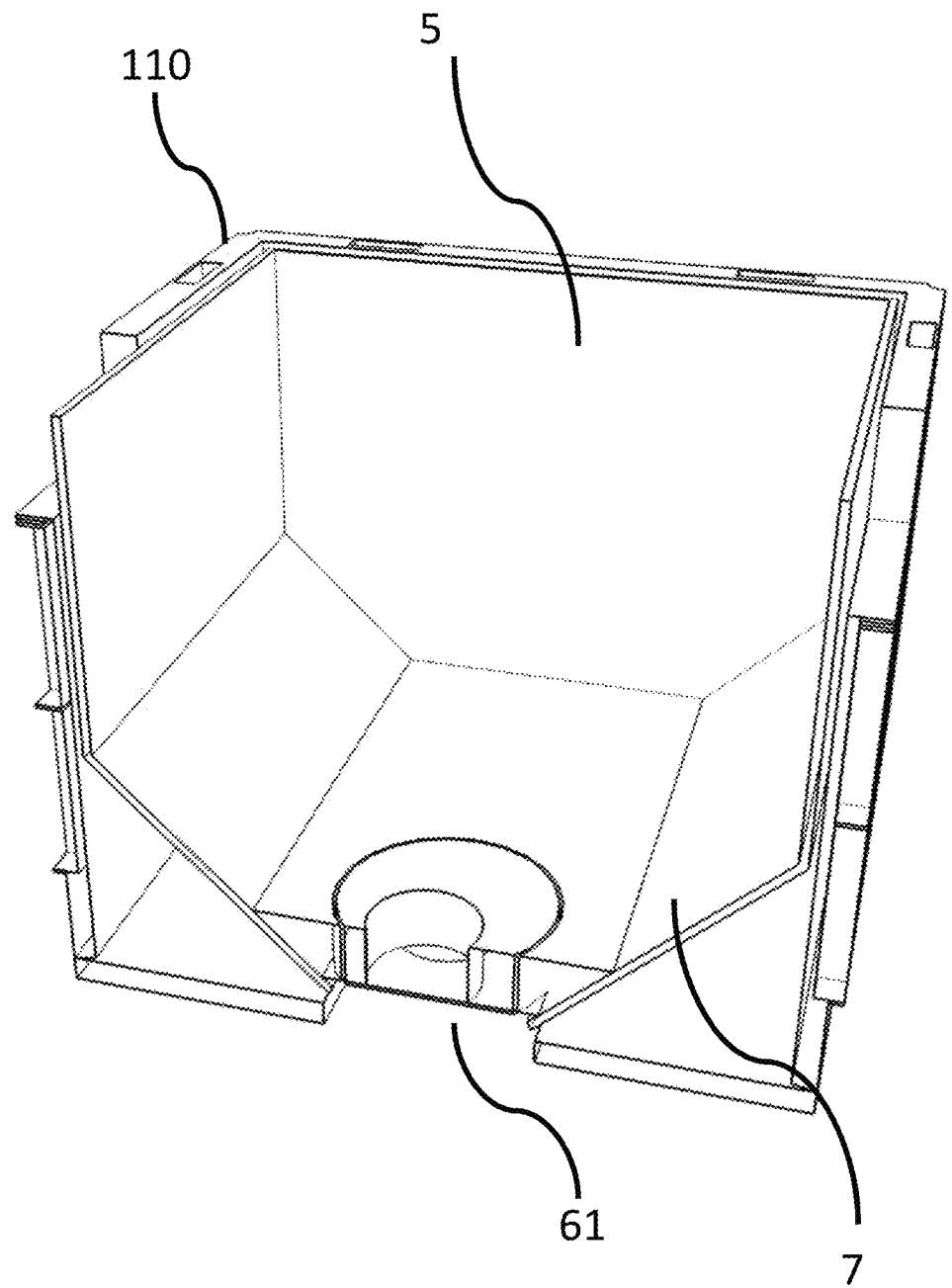
Figure 6:
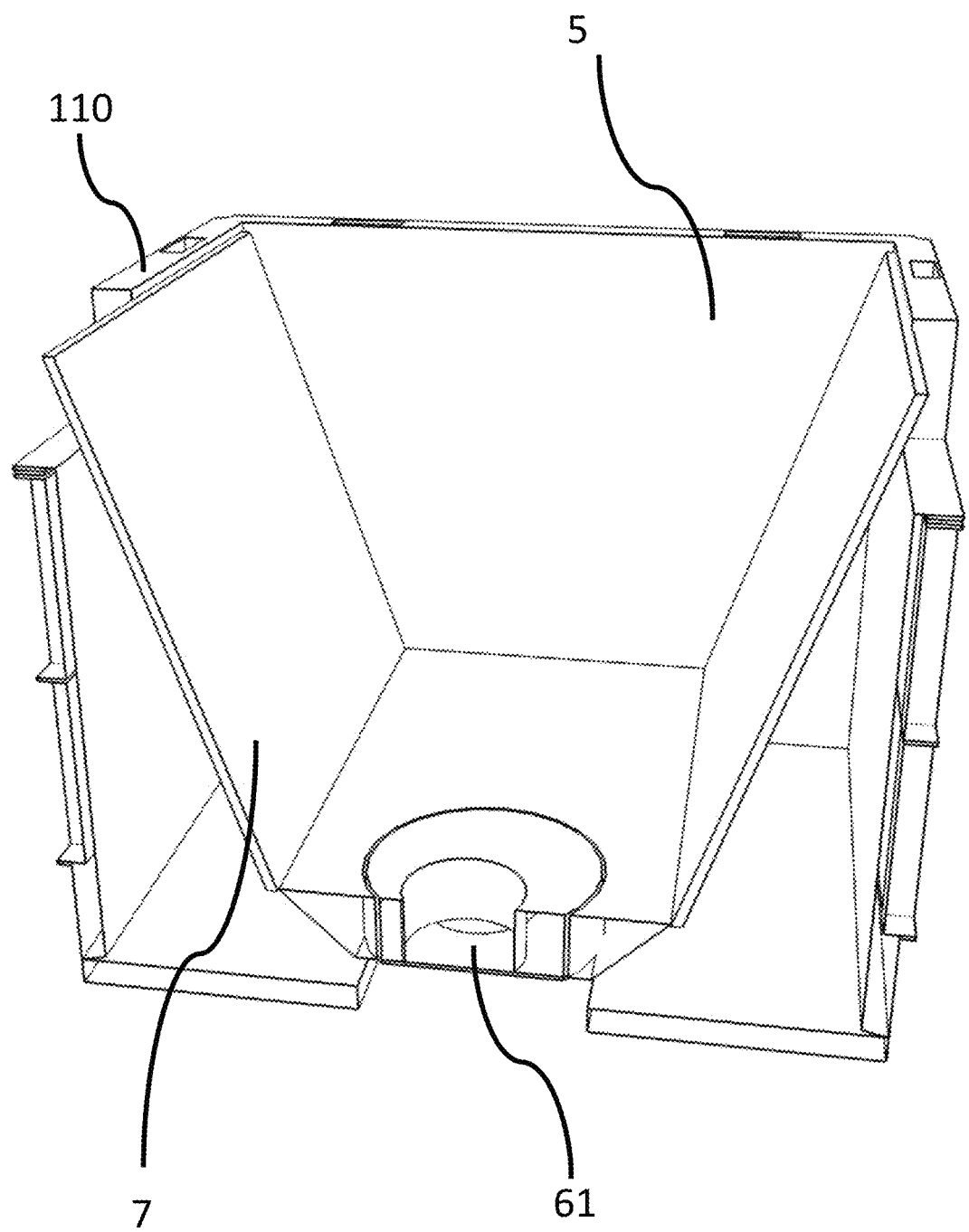
Figure 7:
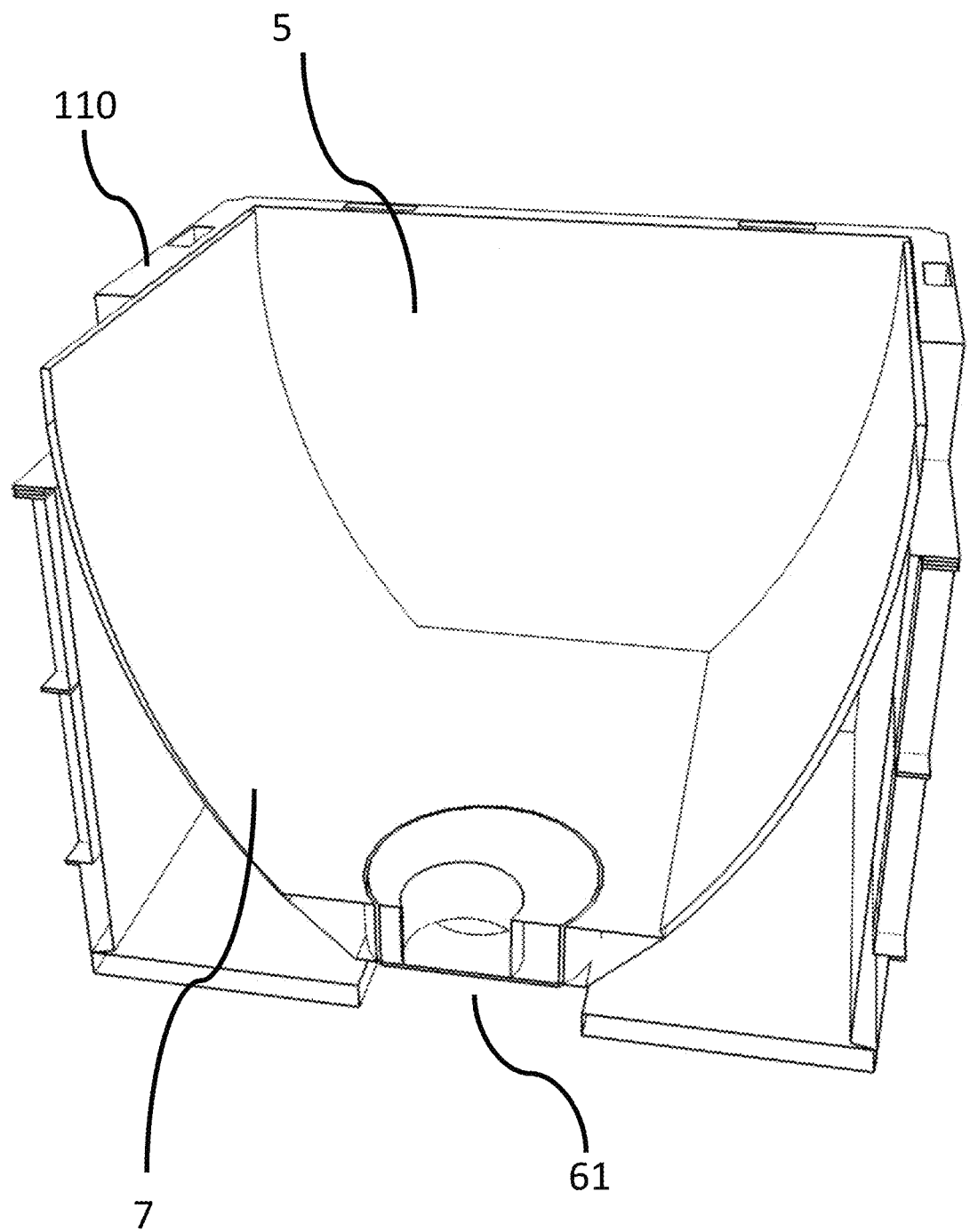
Figure 8A:
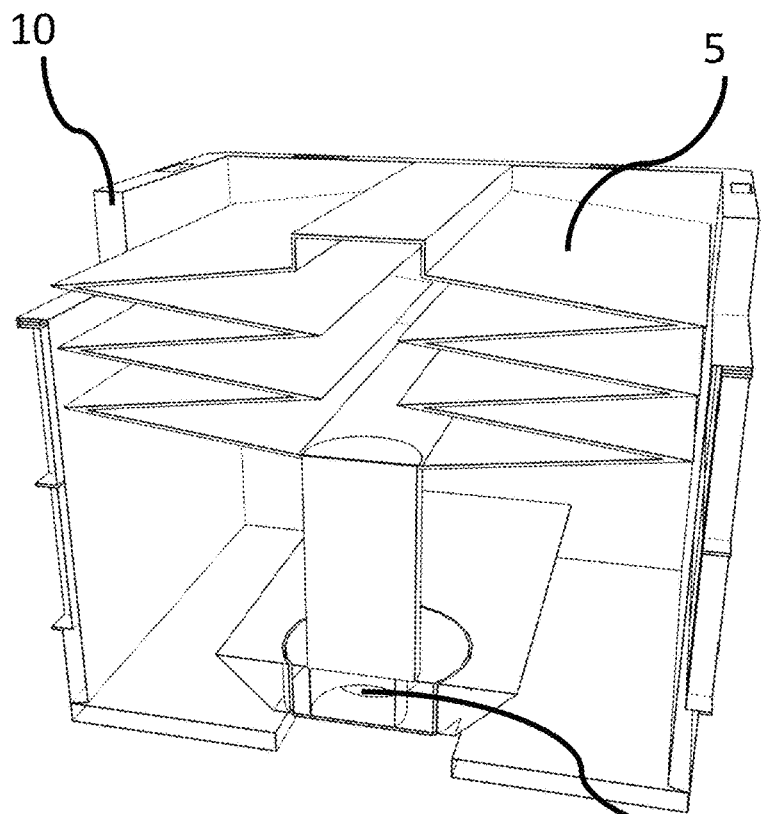
Figure 8B:
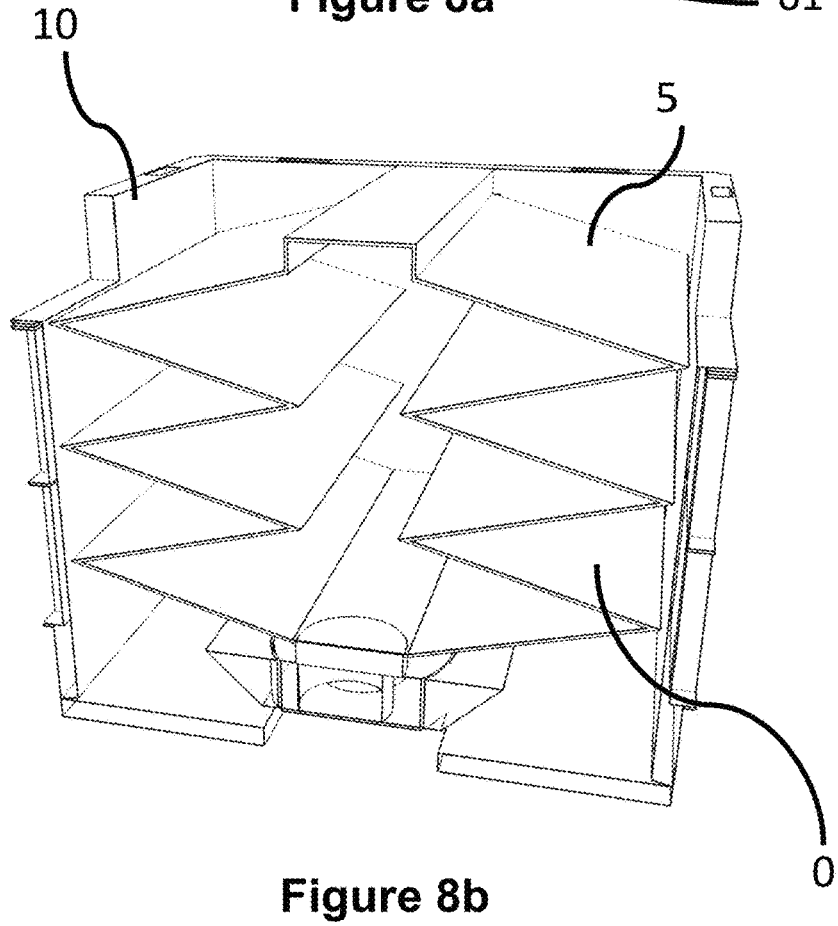
Figure 9A:
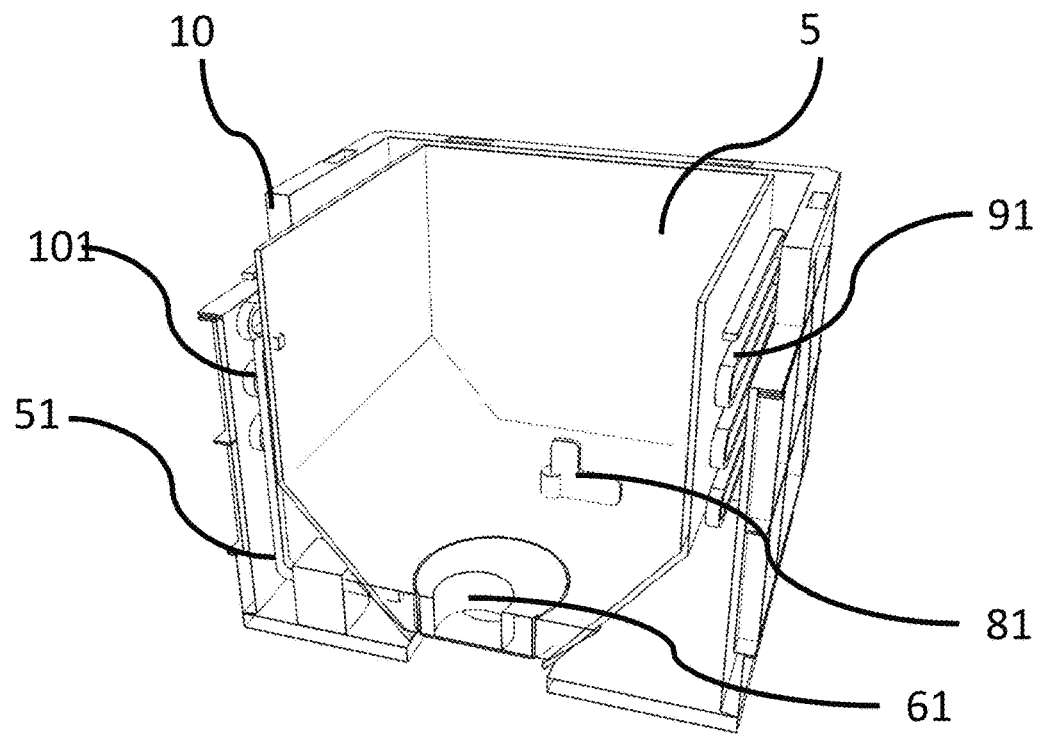
Figure 9B:
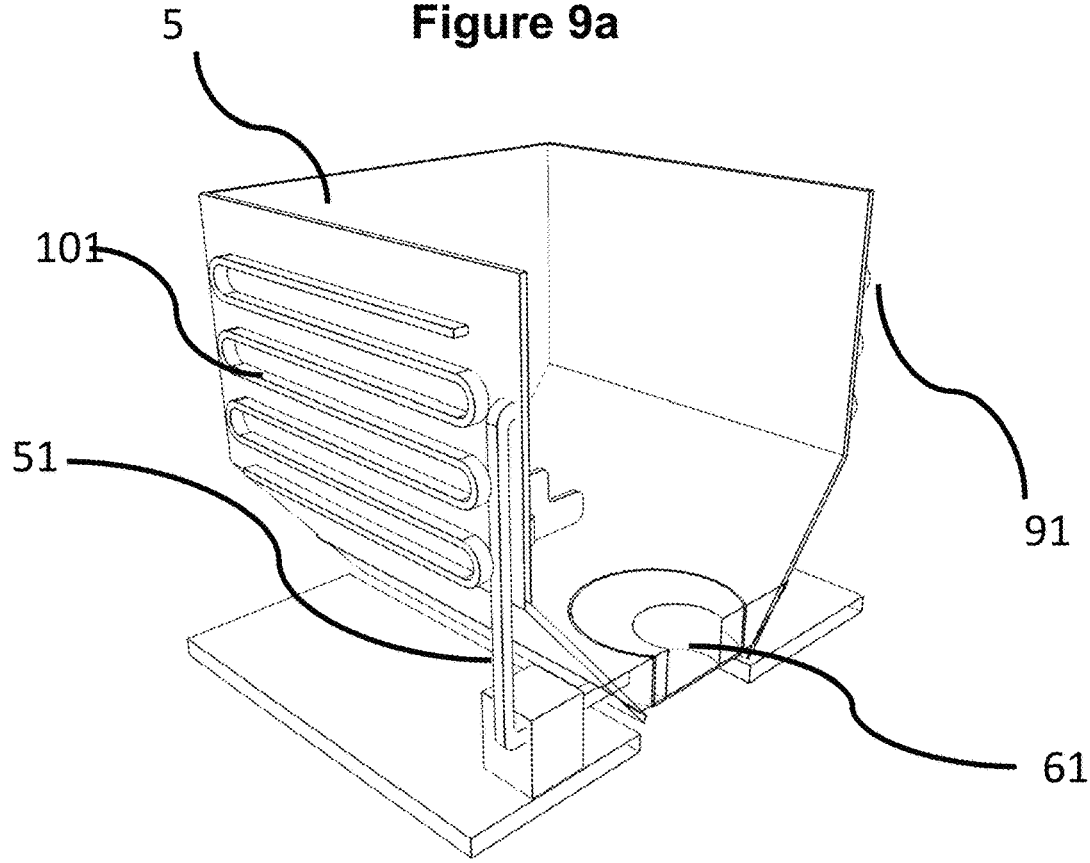
Figure 10A:
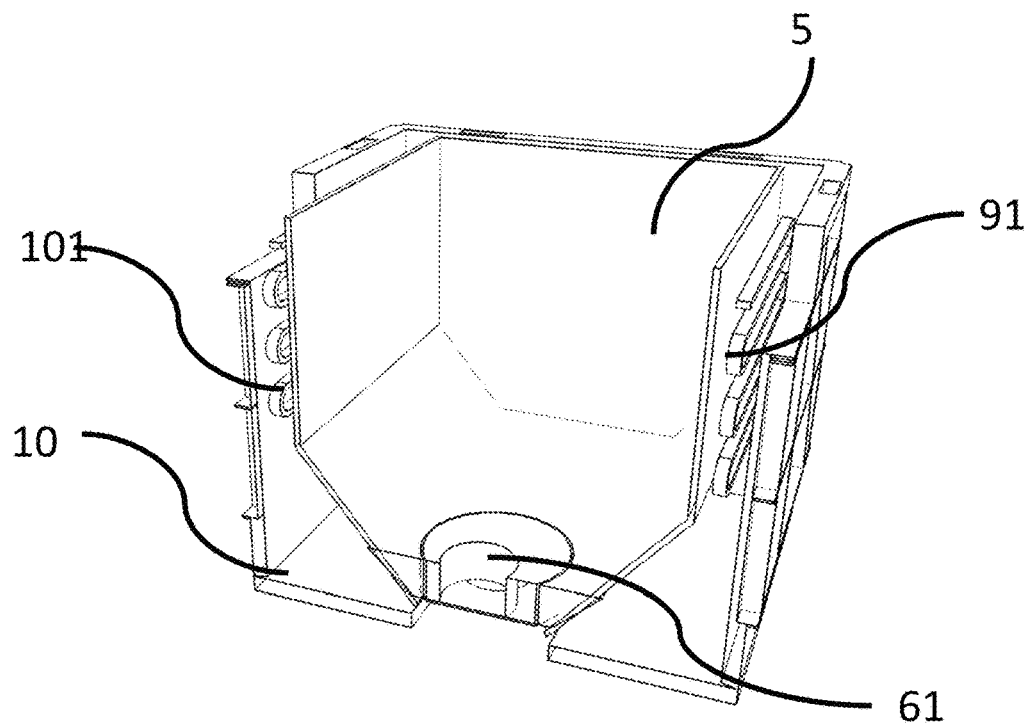
Figure 10B:
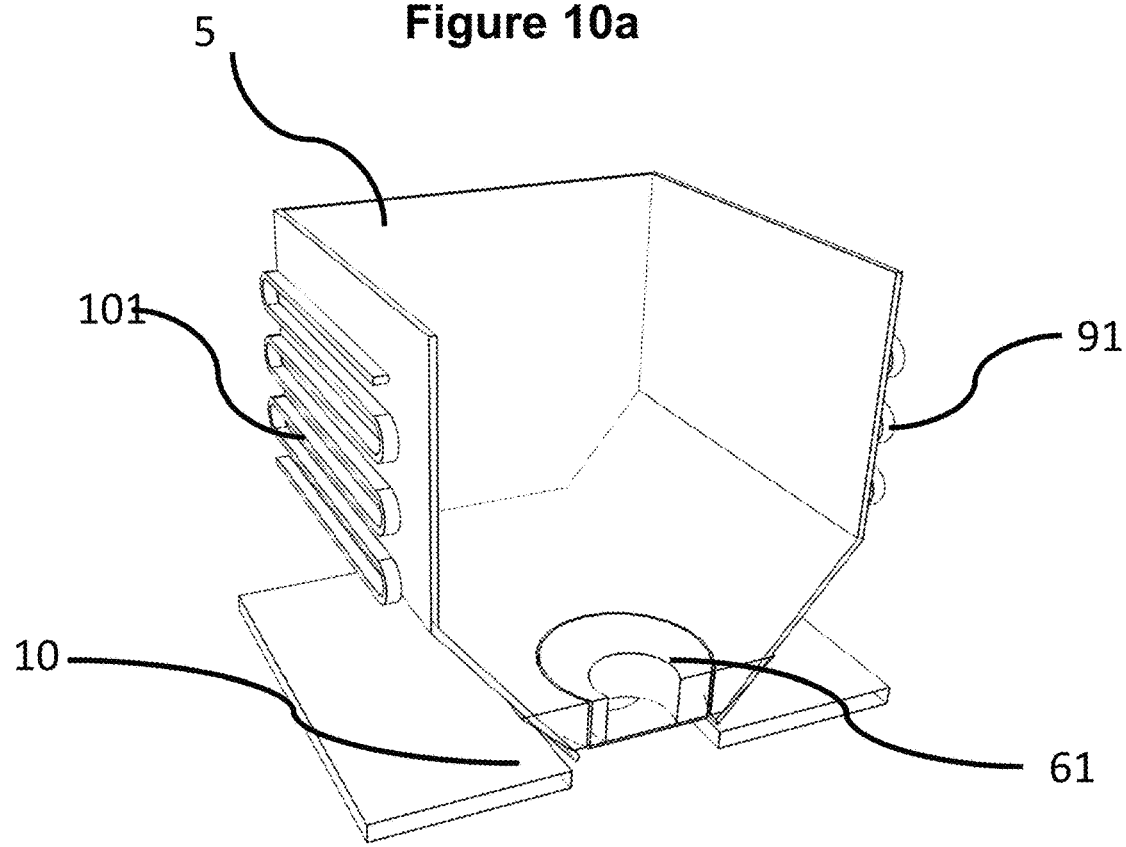
Figure 11:
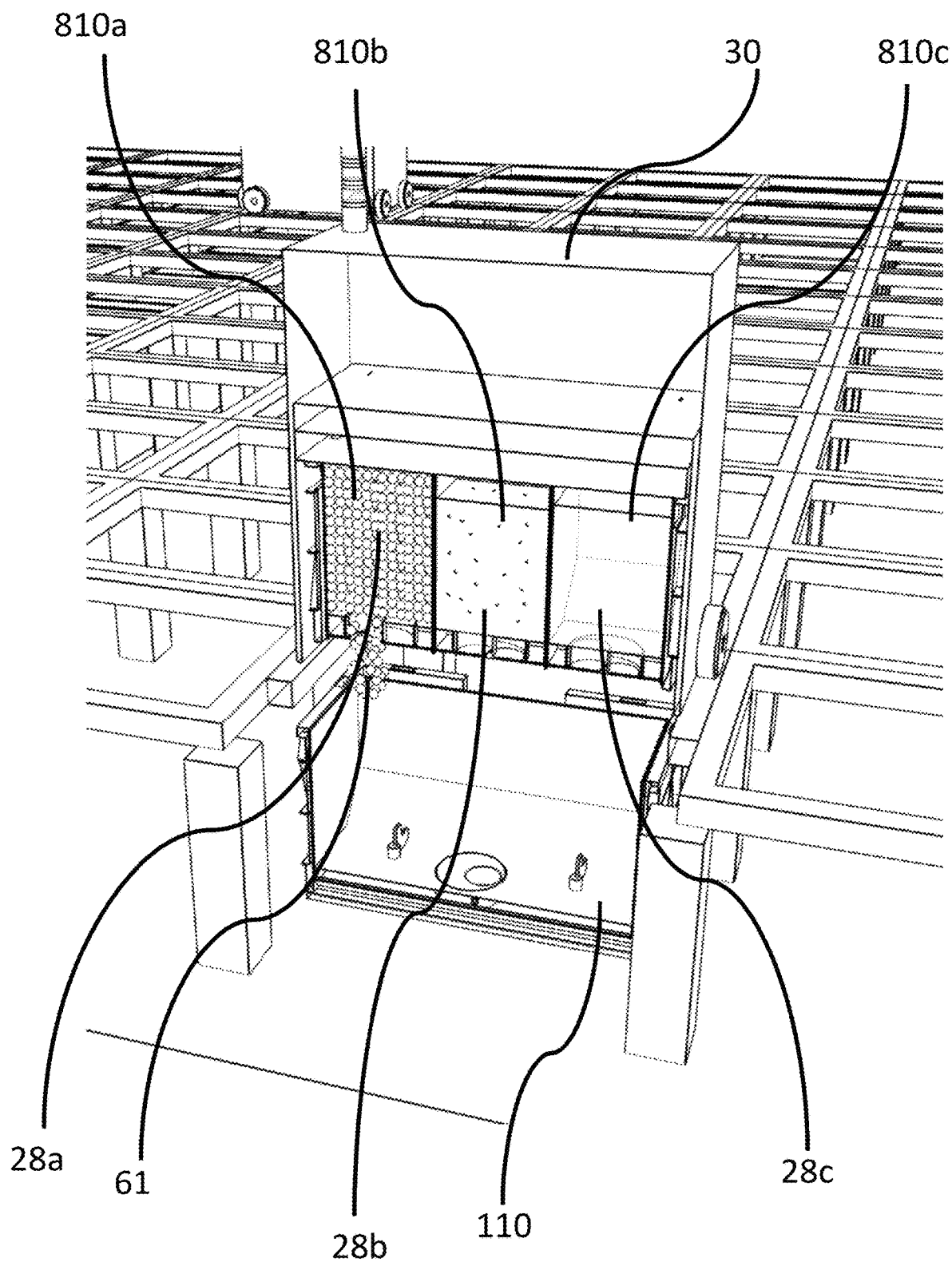
Figure 12A:
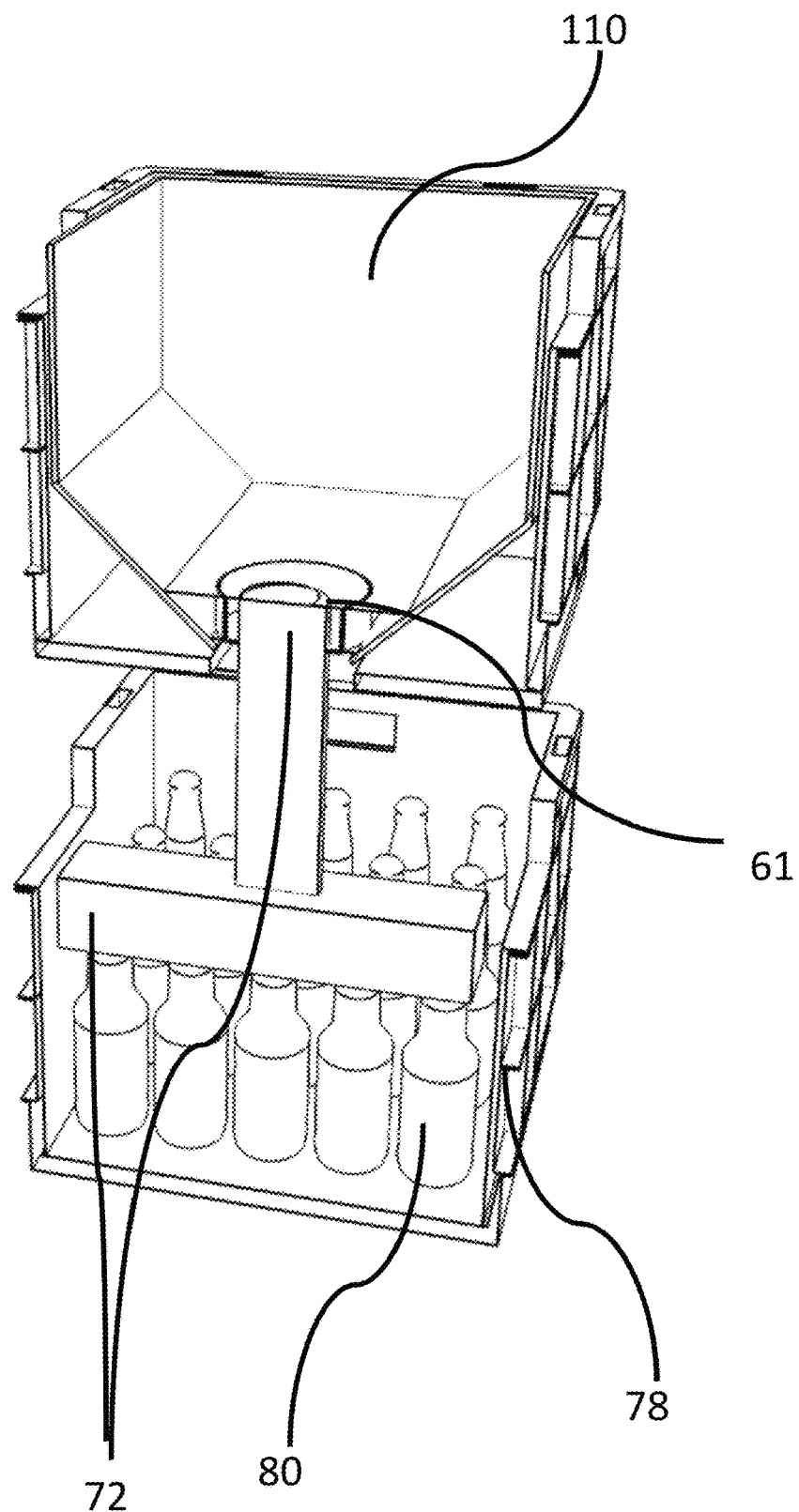
Figure 12B:
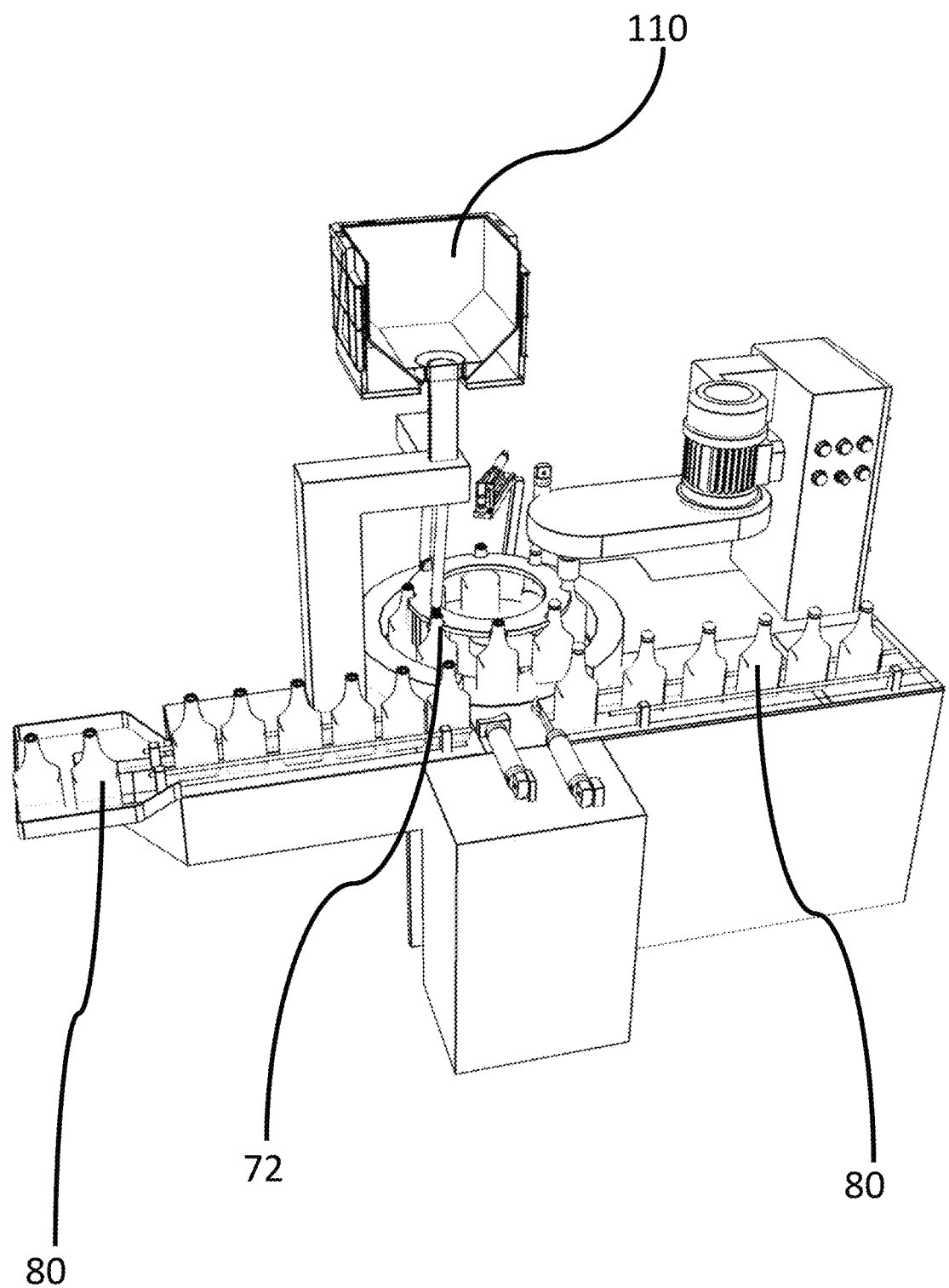
Figure 13A:
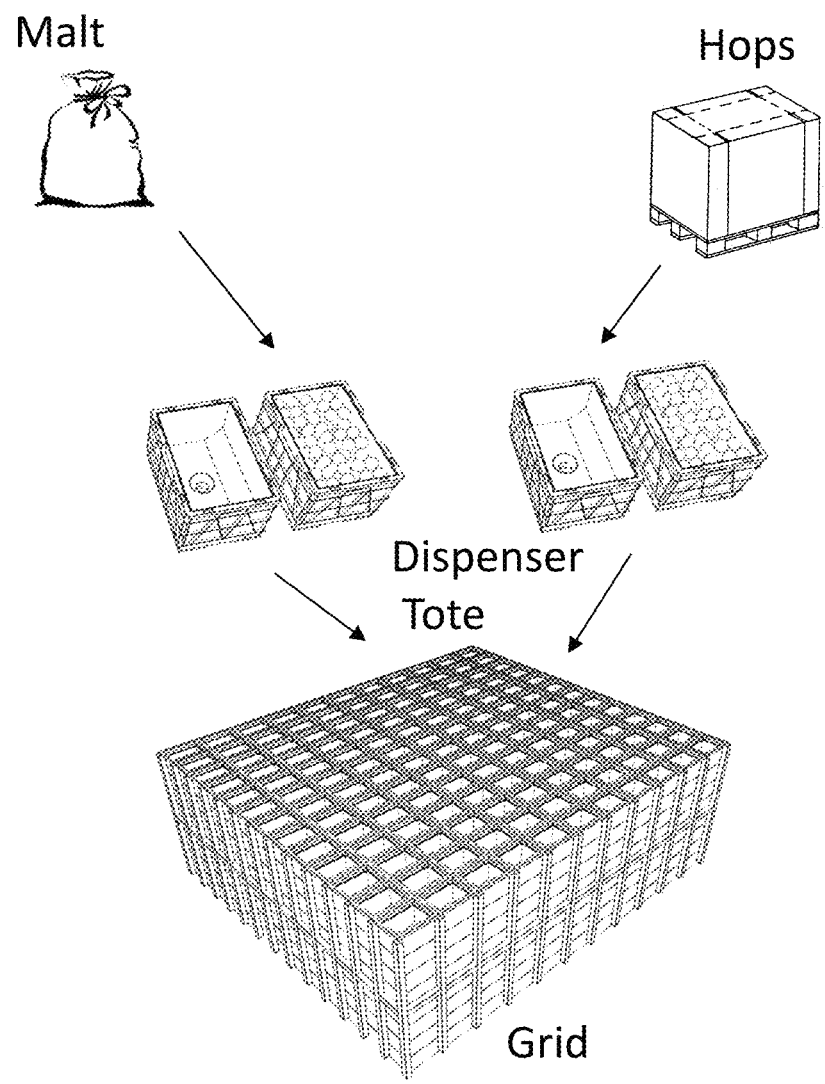
Figure 13B:
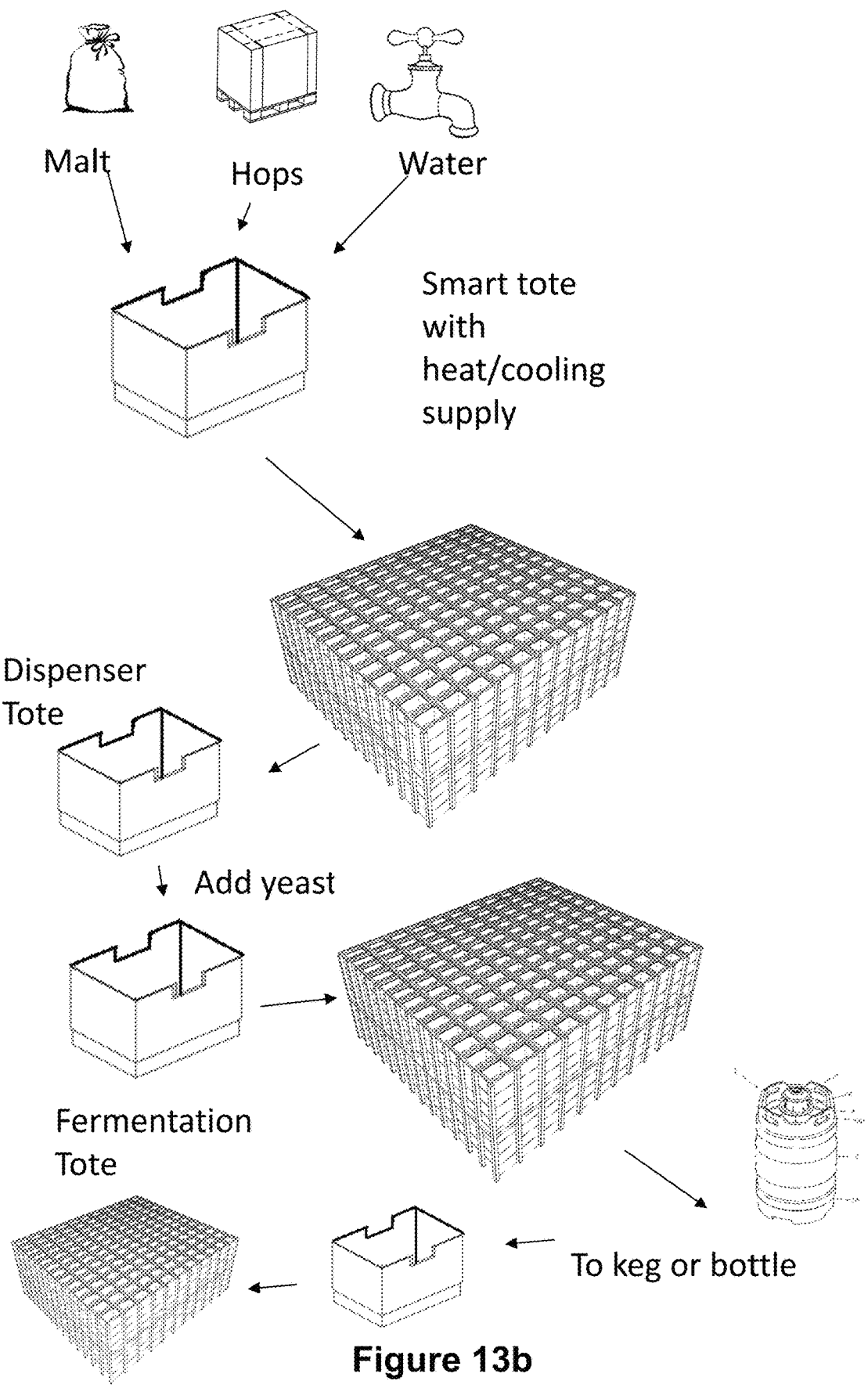

FIGS. 3(*a*) and 3(*b*) are schematic perspective views, from the rear and front respectively, of one form of robotic load handling device for use with the frame structure of FIGS. 1 and 2, and FIG. 3(*c*) is a schematic perspective view of the known load handler device in use lifting a bin;

FIG. 4 is a schematic perspective view of a known storage system comprising a plurality of load handler devices of the type shown in FIGS. 3(*a*), 3(*b*) and 3(*c*), installed on the frame structure of FIGS. 1 and 2;

FIG. 5 is a schematic perspective view of a square sided bin for use in the present invention having a releaseably sealable outlet;

FIG. 6 is a schematic perspective view of a conical sided bin for use in the present invention having a releaseably sealable outlet;

FIG. 7 is a schematic perspective view of a bin having sloping sides for use in the present invention having a releaseably sealable outlet;

FIGS. 8*a* and 8*b* are a schematic perspective views of a bin for use in one form of the invention in combination with an inner liner showing the attachment means between the bin and the liner;

FIGS. 9*a* and 9*b* are schematic perspective views of combined mash tun and lauter tun brewing bin having heating means, cooling means, stirring means, an outlet, recirculation means, pumping means and a false base or filtering means;

FIGS. 10*a* and 10*b* are schematic perspective views of a brew kettle brewing bin having heating and cooling means;

FIG. 11 is a schematic perspective view of one form of load handling device carrying a bin, the bin having several portions for storing materials required in a given process, the bin having dispensing means for dispensing from the carried bin in to an alternative bin for processing;

FIG. 12*a* is a schematic perspective view of a bin of the type in FIGS. 5 to 7 above, showing one form of mechanism for dispensing liquids contained in the bin into bottle contained in a bin below;

FIG. 12*b* is a schematic perspective view of an alternative mechanism for dispensing liquids from a bin in to containers such as bottles; and FIGS. 13*a* and 13*b* are diagrammatic representations of two methods of brewing using the system shown in FIGS. 1 to 4 above according to the present invention.

DEFINITIONS

As used herein the following terms are defined as follows:

Malt is germinated cereal grains which have been dried in a process known as malting.

Malting is the process whereby grains are made to germinate by soaking them in water for a fixed period then stopping the germination by drying the grains.

Grist can be any milled, crushed, ground, malted or cracked cereals or grains.

A mash tun is the vessel in which wort is produced by combining water and grain and holding it a set temperature for a period of time.

Mashing is the process of combining a mix of milled grain typically malted barley with supplementary grains such as corn, sorghum, rye or wheat and heating the mixture. Mashing allows the enzymes in the malt to break down the starch in the grain into sugars, typically maltose to create a malty liquid called wort.

Infusion mashing is where the grains and water are heated in one vessel.

Decoction mashing in which a proportion of the grains are boiled then returned to the mash raising the temperature.

Mashing out is raising the temperature of the mash to stop the enzymatic conversion of starches to fermentable sugars and to make the mash and wort more fluid. The temperature may be of the order of 77° C. depending on the ingredients in use.

A lauter tun is the vessel used to separate grain from sweet wort produced during the mash and where the wort can be sparged. This is usually the same vessel as the mash tun. As is well known in the art it has a false bottom in which thin 0.5 to 1.5 mm slits to retain the solids and allow liquids to pass through. The solids form a filtration medium and hold back small solids allowing the otherwise cloudy wort to run out of the lauter tun as a clear liquid wort.

Sparging is trickling water through the grain to extract sugars. Typically 1.5 times more water may used for sparging than was for mashing, although the ratios can be varied according to the specific brew in progress.

Recirculation is the process of drawing off wort from the bottom of the mash and adding it to the top of the mash. Lauter tuns typically have slotted bottoms to assist in the filtration process. The mash itself functions as a filter capturing debris and proteins.

Lautering is the process in which the mash is separated into a clear liquid wort and the residual, spent grain. Lautering usually consists of three steps: mashing out, recirculation and sparging.

A brew kettle is a vessel in which sweet wort is boiled.

A fermenter is the vessel where yeast converts sugars to alcohol.

As shown in FIGS. 1 and 2, stackable containers, known as bins 10, are stacked on top of one another to form stacks 12. The stacks 12 are arranged in a frame structure 14 in a warehousing or manufacturing environment. FIG. 1 is a schematic perspective view of the frame structure 14, and FIG. 2 is a top-down view showing a single stack 12 of bins 10 arranged within the frame structure 14. Each bin 10 typically holds a plurality of product items (not shown), and the product items within a bin 10 may be identical, or may be of different product types depending on the application.

The frame structure 14 comprises a plurality of upright members 16 and horizontal members 18, 20. A first set of parallel horizontal members 18 is arranged perpendicularly to a second set of parallel horizontal members 20 to form a plurality of horizontal grid structures supported by the upright members 16. The horizontal members together define a grid structure supported on top of the uprights 16. This structure defines grid spaces in the top surface of the framework underneath which the bins 10 are located in stacks 12 within the framework 14. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

The top level of the frame structure 14 comprises rails 22 arranged in the grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the grid structure on the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position in a grid space above any of the stacks 12.

As shown in FIG. 3 each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 are lifted clear of the rails 22, and the second set of wheels 36 are lowered into engagement with the second set of rails 22a. The drive mechanism can then be used to drive the second set of wheels 36 to achieve movement in the Y direction.

In this way, one or more robotic load handling devices 30 can move around above the top surface of the stacks 12 on the frame structure 14 under the control of a central picking system (not shown). Each robotic load handling device 30 is provided with means 38, 39, 40 for lifting out one or more bins or containers from the stack to access the required products.

In this way, multiple bins 10 can be accessed from multiple locations within the framework and stacks 12 at any one time.

FIG. 4 shows a typical storage system as described above, the system having a plurality of load handling devices 30 active on the stacks 12. In addition, a robotic service device 50 is positioned on the grid 14.

A robotic service device 50 comprises a vehicle 52 which is arranged to travel in the X and Y directions on the rails 22 of the frame structure 14, above the stacks 12. Robotic service devices 50 can provide a range of monitoring, support, assistance, cleaning or servicing functions to the grid, the frame structure 14 or the robotic load handling devices 30. Some robotic service devices 50 can remove a load handling device from the rails 22. Some robotic service devices 50 can remove a load handling device 30 from the grid.

The invention will now be described with reference to FIGS. 5 to 13 and the specific example of brewing.

STORING AND DELIVERING BREWING INGREDIENTS

According to the present invention one or more brewing ingredient is stored in one or more storage bin 1.

By way of example only the brewing ingredients to be stored may include one or more of milled grain, crushed grain, grist, malt, malted barley, corn, sorghum, rye, wheat, spelt, water, carbonate, yeast, sugar, hops, malt, flavourings, preservatives, filtering agents and conditioning agents.

A single stack may comprise the same or different ingredients.

Different stacks may be cooled or heated as is well known in the art to ensure their contents are maintained at a desired temperature. Furthermore, multiple stacks may be maintained at a given temperature or multiple stacks may be sectioned off from the remainder of the storage system and kept an a required predetermined temperature.

By way of example only, milled or cracked grain or grist may be stored in a region of the grid which is maintained at below 40° C.

In a first aspect of the invention one or more load handling device conveys one or more storage bin to a micro-brewery.

Optionally prior to delivery of one or more storage bin to the micro-brewery the storage bin and its contents may be pre-heated by conveying the one or more bin to a region or room within the storage system which is maintained at a desired temperature above the bin's contents usual storage temperature.

Some or all of the contents of each storage bin are dispensed, sequentially or simultaneously from the one or more storage bin into the micro-brewery.

By way of example only the micro-brewery may be a Picobrew™

The micro-brewery produces a single batch of beer using a customer's chosen ingredients, recipe and brewing conditions.

Some or all of the micro-brewery may be located within one or more storage bin of the storage system.

Alternatively the micro-brewery may be located away from the grid and connected to it by extensions of the rails 22.

CUSTOMISED BINS FOR STORAGE/BREWING

As shown in FIG. 13*a* each brewing ingredient can be stored directly within one or more storage bin 910.

Alternatively as shown in FIG. 11*a* several different ingredients 28*a* 28*b* 28*c* may be stored within different compartments 810*a* 810*b* 810*c* each having an outlet 61 in a single storage bin.

Bins 10 to be used for ingredient storage must be made of a suitable food grade material which can be readily cleaned and sanitised as required.

Bins for storing fluids such as water, or flavourings must be water-tight.

Optionally storage bins may have a liner 5. The liner may be single use or reusable.

Suitable liner materials for storage bins will depend on the ingredient or ingredients being stored but may include by way of example only plastics, metals, glass, sacking, cotton or like materials.

Storage bins have a releasably sealable opening 61 thorough which the contents of the storage bin are dispensed into the bin below the storage bin in the stack.

UK Patent Application No. GB1519931.8 which is incorporated herein by reference describes a variety of storage bin solutions having a range of different opening arrangements.

Optionally one or more storage bin dispenses some or all of its contents through outlet 61 into a weighing bin (not shown). The weighing bin is provided with weighing means. One or more ingredient may be dispensed into the weighing bin sequentially.

The weighing bin is then conveyed by a load handling device to the micro-brewery where its contents are dispensed into the micro-brewery or a brewing bin.

Alternatively the weighing bin is then conveyed by a load handling device to a brewing bin by a load handling device and its contents dispensed into the brewing bin.

BREWING IN THE BINS

In another aspect some or all of the steps of the brewing process occur within one or more brewing bins within a conventional storage system.

Brewing bins 110 externally resemble storage bins in that they are sized and shaped like conventional storage bins and they can be stacked and moved around a storage system by load handling device as is well known in the art.

Brewing bins 110 to be used for brewing must also be water tight and formed of a rigid food grade material which can be readily cleaned and sanitised between uses. Suitable materials include by way of example only plastics, metals, rubber or like materials.

Some or all of the brewing bins 110 may be of a conventional square sided shape having one or more releasably, sealable opening 61 in a flat base as is well known in the art, as disclosed in GB1519931.8 discussed above.

Some or all of the brewing bins 110 may have one or more sloped or curved or otherwise shaped wall or base 7 as shown in FIGS. 5 to 7 to allow the contents of the bin to be completely dispensed with or without aeration as required.

Brewing bins 110 may be provided with heating means 91 to pre-heat ingredients such as yeasts in advance.

Optionally as shown in FIGS. 5 and 8 one or more bin may be provided with a liner 5. When liners 5 are used the bin 110 does not need to be constructed of food grade material nor does it need to be water tight. The liner 5 may be a single use liner or a washable reusable liner.

Suitable liner materials for brewing bins 110 include by way of example only thermostable plastics, metals, glass, wood, rubber or like materials.

The liner 5 is positioned within the bin and has an opening 61 through which the bin contents can be dispensed.

The liner 5 may be rigid and as shown in FIGS. 5 to 7 can be positioned within the bin with or without further attachment means. Rigid liners may have a sloping, funnel or other wall arrangements 7 surrounding the opening 61 to assist in the complete transfer of the contents from one bin to another. The shape of the liner 5 may also be chosen to enhance or reduce aeration of the brewing bins contents during transfer. It will be appreciated that the interior of the brewing bin 110 may be formed in such a manner removing the need for the liner 5.

Rigid liners 5 may be used in conjunction with similarly shaped storage or brewing bins or alternatively with conventional square sided bins 10.

Alternatively the liner 5 may be a flexible, or semi-rigid membrane as shown in FIGS. 8*a* and 8*b* which conforms to the shape of the bin 10 or 110. Flexible or semi-rigid liners 5 are inserted into and attached to brewing or storage bins 110 by suitable securing means at opening 61. The flexible liner 5 may be of an expandable type formed in a concertina-like manner. Attachment means may include such as by way of example only loops, hooks, pins, protrusions, elastic straps or bands, rubber seals, adhesives, and clips.

Optionally flexible or semi-rigid liners 5 are used in conjunction with specially shaped brewing 110 or storage 10 bins having sloped curved or otherwise shaped walls 7 and bases as shown in FIGS. 5 to 7 to allow materials including liquids to be transferred from one bin 110 to another with or without aeration as required.

As shown in FIGS. 9 and 10 the brewing bins 110 are provided with temperature monitoring means such as a thermometer or thermocouple (not shown), and one or more of heating means 91 and cooling means 101.

The temperature within each brewing bin 110 can be individually monitored and adjusted according to a predetermined, desired protocol that may be requested by a customer in an online retail process.

Alternatively the temperature of one or more brewing or storage bin 110, 10 may be adjusted by conveying it using a load handling device 30 to a temperature controlled region or room within the framework 14 as is well known in the art. By way of example only a single framework 14 may have an area or room below 40° C. for storage bins, an area or room above 40° C. for pre-heating ingredients or brewing bins 110, an area or room at 70-80° C. for mashing, an area or room at 77° C. for mashing out, an area or room for fermentation of ales at 65-76 ° C. and an area or room at for fermentation of lagers at 45-55° C.

Optionally the temperature within an individual brewing bin 110 can be varied by a combination of one or more of the brewing bin's heating means 91, the brewing bin's cooling means 101 and the location of the bin 110 in the storage system.

The brewing bins 110 may also be provided with stirring means such as by way of example only: magnetic stirrer plates (not shown) may be provided in the base of the brewing bin which move magnetic stirrer bar 81 within the brewing bin; ultrasonic plates or the like. The stirring means can be activated periodically or continuously according to a desired protocol.

The duration, type and strength of stirring in each individual brewing bin can be adjusted to maximise or minimise aeration or according to the customers' individual requirements or preferences.

One or more brewing bin may also be provided with a slit base made of wedge wire or like material to enable the brewing bin to act as a lauter tun.

Preferably a brewing bin having heating means 91, cooling means 101, stirrer means 81, a slit base, recirculation means 51 opacity monitoring means and temperature monitoring means acts as a combined mash tun and lauter tun as shown in FIGS. 9a and 9b.

Outlet 61 acts as a run off tube and one or more water inlet provides an even gentle sparge water spray which does not disrupt the grain bed.

Preferably a brewing bin 110 having heating means 91, cooling means 101, acts as a brew kettle as shown in FIGS. 10a and 10b.

Preferably a brewing bin 110 having heating means 91, cooling means 101, stirrer means 81, acts as a fermenter.

In some embodiment brewing bins are also used for storing brewing ingredients.

PROCESS BREWING AS A SERVICE

Prior to brewing the grist, and optionally the water and optionally the brewing bin 110 which is to act as a mash tun and lauter tun are pre-heated.

Pre-heating can occur by transferring the storage bins containing the ingredients, or the brewing bin 110 to be pre-heated to a region of the framework 14 which is maintained at a desired temperature above 40° C.

Alternatively milled or cracked grain or grist is transferred from a storage bin into a brewing bin. The heating means in the brewing bin then heats the milled or cracked grain or grist to the desired temperature. Similarly water is transferred from a storage bin 10 or elsewhere into a brewing bin 110. The heating means 91 in the brewing bin 110 then heats the water to the desired temperature.

MASHING

The water and grist are combined in the mash tun.

The mash tun may be the same bin 10 in which the water or the grist were stored or pre-heated by adding either grist or water to a bin containing the other ingredient.

Alternatively some or all of the contents of a storage bin 10 containing water or grist may be transferred to a separate mash tun brewing bin 110.

The grist and water are mixed by the brewing bin's stirring means 81 or otherwise to ensure all the grist is wetted but without causing splashing and/or aeration thereof.

The temperature of the mash is monitored and adjusted as required.

The contents of the mash tun are heated by heating means 91 located within the mash tun brewing bin 110. Alternatively the mash tun is moved by a load handling device 30 to a region or room within the grid which is maintained at a desired temperature above 70° C.

The grist and water are allowed to stand at the desired temperature for a desired period to produce a wort.

Optionally the grist and water are periodically stirred by the mash tun's stirring means according to a desired protocol.

Lautering the process in which the mash is separated into a clear liquid wort and the residual, spent grist. Lautering usually consists of three steps: mashing out, recirculation and sparging.

MASHING OUT

The temperature of the contents of the mash tun is raised to over 75-80° C. for a predetermined period of time minutes to stop the enzymatic conversion of starches to fermentable sugars and to make the mash and wort more fluid.

Preferably to avoid heating neighbouring bins the mash tun is then conveyed by a load handling device 30 to an area or room within the storage system where mashing out is performed.

The mash tun is heated either by the heating means 91 within the mash tun or alternatively or additionally by external heaters located in the mashing out area or room within the storage system.

RECIRCULATION

The same brewing bin 110 which has acted as a mash tun now acts as a lauter tun.

Sweet wort is removed from the bottom of the mash through an opening and is returned to the top of the mash through an outlet via suitable recirculating means 51. The mash itself functions as a filter capturing debris and proteins. This recirculation process is continued until the wort runs clear.

Optionally a turbidimeter (not shown) is provided in the lauter tun to measure the opacity of the wort to determine the level of solids in the wort.

When the wort has reached the desired opacity the sweet clear wort is drawn off through opening 61 into a brewing bin known as a brew kettle 8 located below the mash tun/lauter tun in the stack.

SPARGING

Water is pre-heated to 75° C.-78° C. and is trickled from the bin above the mash tun/lauter tun in the stack or sprayed gently from one or more spray head provided in the mash tun/lauter tun to extract sugars from the mash.

English or batch sparging drains the wort completely from the mash before more sparge water is added, held at 76° C. then drained again.

Fly or German sparging uses a continuous process. Wort is drawn off and added at the same slow rate.

Batch sparging or fly sparging can be adopted according to the customers' preference. The sparge water is drawn off through opening 61 into the brew kettle 8. Typically 1.5 times more water is used for sparging than was for mashing but other ratios may be considered. For example 50% of the original could be used.

BOILING

Preferably to avoid heating neighbouring bins the filled brew kettle brewing bin 110 is conveyed by a load handling device 30 to an area or room within the storage system where boiling is performed.

The brew kettle bin is heated to approximately 100° C. either by the heating means 91 in the brew kettle bin 110 or alternatively by external heaters located in or around the grid in the boiling area or room.

The wort is boiled vigorously for a desired period usually of between 1 and 2 hours.

Optionally a load handling device dispenses hops, or other flavourings into the brew kettle 8 and the wort is boiled vigorously again for a desired period usually of between 1 and 20 minutes.

The wort is cooled either by cooling means 101 in the bin. Alternatively the wort is transferred by a load handling device to a region or room within the grid which is maintained at a temperature below 30° C. to be cooled.

Optionally before or after cooling the wort is filtered, spun or otherwise treated to remove hop matter and coagulated proteins.

FERMENTATION

The brew kettle bin 110 containing cooled wort is transferred by a load handling device 30 to a position in a stack where it is located above a brewing bin 110 which acts as a fermenter 22.

The wort is dispensed though opening 61 into the fermenter.

Yeast and optionally sugar, or flavourings are added to the fermenter by a load handling device and the mixture aerated by shaking, vigorous stirring or otherwise.

The wort is heated to a desired temperature of between 35° C. and 85° C. depending on the type of beer being brewed and the customers' requirements and allowed to ferment for a desired period.

Generally ales require fermentation at elevated temperatures for a period of weeks. The precise temperatures and time periods depend on the drink being brewed. For example lagers may be fermented at a lower temperature than other drinks.

The fermenter bin can be heated by local bin heating means 91. Alternatively the fermenter bin is transferred by a load handling device 30 to a region or room within the storage system which is maintained at the desired temperature to effect fermentation.

Optionally filtering agents to cause yeast to clump together which are well known in the art are added to the fermenter. Alternatively, oxygen may be pumped in to improve the fermentation process.

Yeast will usually settle to the bottom of the fermenter and can be drawn off before bottling the beer.

Optionally yeast sediment can be removed by passing the contents of the fermenter through a filtering arrangement prior to bottling.

Transfer beer to bottles or kegs.

As shown in FIG. 12*a* the outlet 61 may be provided with dispenser means 72 that dispenses beer into bottles 80 in a delivery crate 78 in a storage bin 10 so that the beer may be bottled within the storage system. Optionally the bottles are pre-labelled.

Alternatively the fermenter may be conveyed by a load handling device to a bottling area of the type shown in FIG. 12*b*.

Optionally carbonate or sugar may be added before or after transferring the beer to bottles or kegs.

Optionally one or more of yeast and sugar are added to the bottles or kegs before or after transferring the beer to bottles or kegs to bottle condition the beer and improve shelf life.

The bottles or kegs are sealed and stored for at least 3 days prior to consumption.

KILNING

In a further aspect of the present invention one or more brewing bin 110 may be used for kilning grains to produce malt in the storage system.

A storage bin 10 containing raw grain is moved by a load handling device to a position above a brewing bin 110 and the grain is dispensed from the storage bin 10 into the brewing bin 110.

The cereal is washed to remove chaff.

Water is added and allowed to stand for about 8 hours.

The water is removed through outlet 61 and fresh water introduced and allowed to stand for about 8 hours.

The process is repeated several times for 4-10 days until shoots of a desired length have appeared.

The cereal is heated to stop the germination process. Heating can be achieved either using heating means 91 within the brewing bin 110, or by conveying the brewing bin 110 to an area or room within the storage system which is maintained at a high temperature to stop the germination process and the malt is ready for brewing.

Different processes may be added to produce different types of malt which in turn will produce different tastes of beer.

There are many other foodstuffs or drinks that may benefit from processing within a storage environment. These include the distilling process for gin, and other processes for the production of kefir, yoghurt and winemaking.

In a second embodiment of the invention the bins or containers may be used to store and process gemstones.

The processing of gemstones using a lapidary technique includes a series of steps as described below. Each step requires a different but predetermined and distinct process step varying in time and in the commodity used to process the stones, depending on the nature of the stone and the final outcome required. Each step may be performed in a separate bin or container, the bins or containers being reconfigurable or reordered dependent on the process parameters required.

For tumbling of rocks as a lapidary technique, a plastic or rubber-lined barrel is loaded with a consignment of rocks, all of similar or the same hardness, some abrasive grit, and a liquid lubricant. Such a barrel may be located in a first bin or container.

The abrasive grit may be silicon carbide grit, and water may be used as the lubricant, however, other abrasives and lubricants may be used.

The barrel is then placed upon slowly rotating rails located within a bin or container such that it rotates. The optimal speed of rotation depends on the size of the tumbler barrel and materials involved.

A well-chosen speed for stone polishing causes the rocks within the barrel to slide past each other, with the abrasive grit between them. The result of this depends on the coarseness of the abrasive, and the duration of the tumble.

It will be appreciated that there may be a number of bins or containers each containing tumblers rotating at different speeds and containing different lubricants, abrasives and stones.

In a known tumbling polishing process, the processing time from rough rock to polish takes between 3-5 weeks, and is done in a series of predefined steps.

Firstly, the rocks are smoothed with a coarse grit (such as 60-90 mesh). The idea behind the first step is to take rough rock or stone and grind it (tumble it) down into a form which is indistinguishable (in shape) from the final product. This first step may be carried out in a first bin or container.

This is followed by a second step of washing and cleaning. The stones contained in the bin or container of the first step may be transferred in to a second bin or container providing the washing and cleaning means of the second step. The transfer may take place by the robotic load handling device removing the first container from the storage system to an outlet port whereby the contents are transferred manually or robotically in to the container capable of carrying out the second step. Alternatively, the first container may be provided with suitable dispensing means for transferring the contents of the first container in to the second container.

The third step comprises further tumbling using finer grits, for example 120-220 then 400-600 mesh. This third step may be carried out in a third bin or container and in a manner similar to that described above in relation to the first and second step, the contents of the second bin or container may be transferred in to the third container.

Additional steps may be required, for example bins or containers may be provided for pre-polishing using an abrasive compound of 1200 grit; further washing using a washing cycle with detergent to remove any grit on the stones.

The final step is a polishing stage using powdered polish, such as cerium oxide or tin oxide, water, and often small plastic pellets that are designed to cushion the stones as they tumble so as not to cause chipping and carry the polish evenly across the stones. It will be appreciated that other polishes and lubricants may be used.

The precise tumbling duration is determined by many factors, including the hardness of the rock and the degree of smoothing desired in the coarser steps. Some processing methods tumble stones with rough grit for two, three or even four weeks to achieve desired shapes out of the stones.

The process above refers to rotary tumbling occurring in the bins or containers. However, vibratory tumbling may be used in place of rotary tumbling. There are two differentiating factors, however, that may lead one to use a vibratory tumbler. First, vibratory tumblers retain the overall shape of the rough rock, whereas rotary tumblers tend to make rocks round. Thus, it is important to use vibratory tumbler to make faceted shapes and tear drop forms. Second, vibratory tumblers tend to process much faster than rotary tumblers, generally reducing the process time to half.

Therefore, it will be appreciated that a given system may contain, at any one time, bins or containers performing any or all of the above processes in relation to gemstone processing, the robotic load handlers employed so as to remove bins or containers as required when the content of given bins or containers require transferring in to alternative bins or containers or removal from the system completely.

In a third embodiment of the invention the system may be used to provide a storage and processing system for storing and processing a variety of active ingredients for the preparation of medicaments.

In this embodiment, a series of bins or containers providing the means necessary for processing the raw materials in a predetermined but variable processing order, as required by the manufacturing steps of the medicaments. Such a process may include the process of microbial fermentation, but other processes may be used.

In microbial fermentation pharmaceutical compounds may be produced by a technique including fermentation.

Microbial fermentation is the conversion of organic materials into relatively simple substances by micro-organisms. During their growth and lifespan, micro-organisms build a wide range of different molecule types. These are required for viability and multiplication; adaptation to changing environment; stressful conditions and defence against hostile, competitive microbial threats.

Micro-organisms that are typically used within the pharmaceutical industry include: prokaryotes such as bacteria (e.g. *Escherichia coli, Staphylococcus aureus*) and Streptomycetes (e.g. *Streptomyces* spp, *Actinomyces* spp), eukaryotes such as filamentous fungi (e.g., Nigrospora spp, Aspergillus spp,) and yeast (e.g. Saccharomyces cereviciae, Pichia pastoris). However, it will be appreciated that the processes referred to need not be limited to these specific micro-organisms and many other organisms are envisaged for such use.

Preferably, the molecules are small molecules such as short peptides and low molecular weight organic molecules, larger molecules including proteins and nucleic acids (DNA, RNA) and macromolecules such as lipids and carbohydrate polymers, plus various combinations of product types, for example lipopolysaccharides, lipopeptides, peptidoglycan. Any of these product types could potentially serve as a drug's Active Pharmaceutical Ingredient (API).

Microbial fermentation is the basis for the production of a wide range of pharmaceutical products, targeting practically any medical indication. Examples range from anticancer cytotoxic drugs and vaccines, anti-infectious disease antibiotics and vaccines, to hormonal disorder therapy and many other indications.

Natural biosynthesis of endogenous molecules involves specific multi-step complex routes and processes, some of which can be manipulated for the biosynthesis of foreign molecules. Micro-organisms may be genetically modified (recombinant technology) or metabolically engineered by substantial alteration of their endogenous routes. Each and any of these processes may be carried out, under the correct conditions, in an individual bin or container within the storage and processing system.

The key elements of fermentation development are strain selection and optimisation, media and process development, and finally, scale-up to maximise productivity. Downstream processing utilises various technologies for extracting, concentrating and purifying the product from a dilute fermentation broth. It will be appreciated that the selection and optimisation process may be conducted using appropriate means in a first bin or container; the media and process development may be conducted using suitable means in a second bin or container and the productivity and scale up may be conducted via suitable means in a third bin or container. Furthermore, the downstream processes may be conducted via suitable means in a further series of bins or containers.

In a fourth embodiment of the invention the system may be used to provide a storage and processing system for storing and processing raw ingredients for the preparation of foodstuffs.

In one form of the embodiment of the invention, the process conducted in the system may comprise baking. In this form of the invention, individual bins or containers may be used to store the raw ingredients such a flour, yeast, water, milk or any other ingredient required.

The bins or containers comprise suitable dispensing means to dispense the ingredients from the individual storage bins or containers in to a mixing bin or container. The mixing bin or container comprises means for mixing the raw ingredients such as via a motorised paddle, for the required time at the required temperature. It will be appreciated that all the ingredients may be transferred to the mixing bin or container in parallel or may be transferred in a series in a predetermined order.

The mixing bin or container processes the raw ingredients and mixes them for the required time at the required temperature. The contents of the mixing bin may then be transferred to a baking bin or container to allow the bakery product to bake.

The baking bin or container is provided with suitable controllable heating means. The length of time and temperature profile of the baking bin or container may be varied as required by the specific product container therein. Additionally it may be possible to provide individually customisable levels of baking or heating as required.

It will be appreciated that there may be common ingredients to all the products being baked in the system, for example flour and water, but there may also be speciality products that may not be required in all final baked products, for example olives, chocolate chips or raisins. The system allows for the transfer of materials between containers either via removal of the container via a load handling device to an output port where the transfer may occur robotically or manually, or the transfer may occur within the system via suitable dispensing means within the bins or containers.

It will be appreciated that the dispensing means need not be the same form of dispensing means for each bin or container. For example, a bin or container comprising flour will require a different form of transfer or dispensing mechanism than a container comprising a fluid such as water. It will be appreciated that any form of dispensing mechanism may be used appropriate to the content of the bin or container.

Furthermore, it will be appreciated that whilst the fourth embodiment has been described in relation to bread and baking, other foodstuffs may be processed using a similar technique. Such foodstuffs may include but not be limited to living organisms such as insects or shellfish.

In all the examples described above, the ingredients or raw materials may be stored in the bins of the storage system and then processed within specially adapted bins having the same overall shape as the storage bins but having means for performing additional functions such as heating, cooling, mixing, freezing, soaking and the like.

It will also be appreciated that the processing of substances within the bins can be for part of the process only and other specialist equipment could be co-located within a storage system of the type described, and the bins used to store ingredients or transfer ingredients at different points in the process as necessary.

In the specific example above in relation to brewing the bins 10 are referred to 'brewing bins 110'. It will be appreciated that in the case of using the storage system for reactive processing these bins 110 will be 'process bins' and may contain other services as required by the specific process being undertaken.

The invention claimed is:

1. An automated storage and processing system comprising:
   a series of bins located in stacks within a framework, the framework including:
      a grid structure defining a series of grid spaces, each grid space being defined by a footprint of a stack of bins, and
      a series of tracks or rails above the stacks of bins,
      at least one load handling device operable on the tracks or rails, the at least one load handling device configured for:
         lifting at least one bin from a stack in to the at least one load handling device, and
         moving on the tracks or rails to move at least one bin of the series of bins as required by a process being undertaken within the system, to other locations within the system or to an output port of the system,
   each bin having a first portion of for storing raw materials to be processed, and a second portion having one or more components configured to perform a processing operation on the raw materials stored within the first portion of the bin;
   dispensing means for passing the processed materials from one bin in the series of bins to another bin in the series of bins, a processing of the raw materials from a first bin to a last bin in the series of bins being conducted without user intervention such that raw materials input into each bin in the series of bins are processed in accordance with a predetermined series of steps performed to achieve an end result, each of the steps being conducted in accordance with the one or more components configured to perform the processing operation on the raw materials in a predetermined bin,
   the dispensing means forms one or more inner walls and a bottom surface of at least one bin in the series of bins, wherein the one or more inner walls have a specified shape for directing the raw materials through an opening at the bottom surface of the at least one bin to transfer the raw materials to another bin in the series of bins.

2. An automated storage and processing system according to claim 1, wherein the series of bins include one or more one or more components arranged as a micro-brewery.

3. An automated storage and processing system according to claim 2, comprising:
   a multiplicity of different stored brewing ingredients for conveyance to an external or internal micro-brewery.

4. An automated storage and processing system as claimed in claim 3, wherein the micro-brewery is a Picobrew™.

5. An automated storage and processing system according to claim 1, wherein the one or more components configured to perform the processing operation on the raw materials of the bins comprise:
   one or more of: a heater, a cooler, a stirrer, a temperature monitor, an opacity monitor, a slit base, recirculation component, a water inlet, a bottling component, a filter, a scale.

6. The automated storage and processing system according to claim 1, wherein the dispensing means of each bin includes a single use or reusable liner for a bin.

7. A bin for use in an automated storage and processing system as claimed in claim 6, comprising one or more of:
heating means, cooling means, stirring means, temperature monitoring means, opacity monitoring means, a slit base, recirculation means, water inlet means, bottling means, filtering means and weighing means.

8. An automated storage and processing system according to claim 1 for storing a multiplicity of different foodstuffs or ingredients in storage bins of the stacks of bins within the system, said system comprising:
a plurality of process bins of the series of bins having one or components configured for processing the ingredients transferred in to said process bins from the storage bins, the ingredients being processed by the one or more components in accordance with a predetermined series of variables to produce foodstuffs.

9. An automated storage and processing system according to claim 8, in which the process bins comprise:
mixing bins or baking bins or heating bins or proving bins.

10. An automated storage and processing system according to claim 1 for storing a multiplicity of gemstones in storage bins of the stacks of bins within the system, the system comprising:
a plurality of process bins of the series of bins, having one or more components configured to perform a processing operation on the gemstones transferred into said process bins from said storage bins, the one or components configured to process the gemstones in accordance with a predetermined series of variables to grind and polish the stones.

11. An automated storage and processing system according to claim 10, in which at least some of the process bins comprise:
grinding bins or tumbling bins or cleaning bins or polishing bins or vibrating bins.

12. An automated storage and processing system according to claim 1, for storing chemical ingredients suitable for production of medicaments in storage bins of the stacks of bins, the system comprising:
a plurality of process bins in the series of bins having one or more components configured to perform a processing operation on the chemical ingredients transferred in to said process bins from said storage bins, the one or more components configured to process the chemical ingredients in accordance with a series of predetermined variables to produce the required medicaments.

13. An automated storage and processing system according to claim 12, in which at least some of the process bins comprise:
fermentation bins suitable for microbial fermentation.

14. The system of claim 1, wherein the specified shape of the one or more inner walls is sloped.

15. The system of claim 1, wherein the specified shape of the one or more inner walls is curved.

16. The system of claim 1, wherein the dispensing means includes a liner attached to the one or more surfaces of the at least one bin.

17. A method of performing a process within an automated storage and processing system, the system having a plurality of containers stacked in stacks within a framework, the framework including:
a grid structure defining a series of grid spaces, each grid space being defined by a footprint of at least one stack of containers, and
a series of tracks or rails above the stacks of containers,
at least one load handling device operable on the tracks or rails, the at least one load handling device configured for:
lifting at least one container from a stack in to the at least one load handling device, and
moving on the tracks or rails to move at least one of the plurality of containers in the stacks as required by a process being undertaken within the system, to other locations within the system or to an output port of the system,
each container having a first portion for storing raw materials to be processed, and a second portion having one or more components configured to perform a processing operation on the raw materials stored within the first portion of the container;
dispensing means for passing the processed materials from one container of the plurality of containers to another container of the plurality of containers, wherein a processing of the raw materials from a first container to a last container in a series of containers in the plurality of containers being conducted without user intervention such that raw materials input into each container in the series of containers are processed in accordance with a predetermined series of steps performed to achieve an end result, each of the steps being conducted in accordance with the one or more components configured to perform the processing operation on the raw materials in a predetermined container, the dispensing means forms one or more inner walls and a bottom surface of at least one container of the plurality of containers, wherein the one or more inner walls have a specified shape for directing the raw materials through an opening at the bottom surface of the at least one container to transfer the raw materials to another container in the plurality of containers, the method comprising:
storing the raw materials within storage containers of the plurality of containers within the stacks of the framework;
moving one or more process containers of the plurality of containers using the at least one load handling device on the tracks or rails of the framework, the one or more process containers being required containers for performing the processing operation on the raw materials;
dispensing, by the dispensing means, the raw materials into one or more process containers for processing; and
dispensing, by the dispensing means, resultant processed materials from the one or more process containers into a suitable storage container.

* * * * *